(12) United States Patent
Helbing

(10) Patent No.: US 6,198,523 B1
(45) Date of Patent: Mar. 6, 2001

(54) FERROELECTRIC LIQUID CRYSTAL LIGHT DOUBLER WITH TEMPERATURE AND VOLTAGE CONTROLLED TILT ANGLE

(75) Inventor: Rene P. Helbing, Palo Alto, CA (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/429,246

(22) Filed: Oct. 28, 1999

(51) Int. Cl.[7] .............................. C09K 19/02; G02F 1/13; G09G 3/36

(52) U.S. Cl. ............................ 349/171; 349/199; 345/97; 345/101

(58) Field of Search ............................ 349/25, 117, 171, 349/172, 184, 199; 345/97, 101

(56) References Cited

U.S. PATENT DOCUMENTS

| | | | |
|---|---|---|---|
| 4,941,735 | * 7/1990 | Moddel et al. | 350/342 |
| 5,977,942 | * 11/1999 | Walker et al. | 345/97 |
| 5,986,740 | * 11/1999 | Robinson et al. | 349/201 |
| 6,144,421 | * 11/2000 | Crandall | 349/25 |

* cited by examiner

Primary Examiner—William L. Sikes
Assistant Examiner—Tarifur R. Chowdhury
(74) Attorney, Agent, or Firm—Marc R. Mayer

(57) ABSTRACT

A ferroelectric liquid crystal-based switchable half-wave plate with improved alignment control, a ferroelectric liquid crystal-based light valve system with improved contrast control, and a method of improving contrast in a ferroelectric liquid crystal-based light valve system. The switchable half-wave plate with improved alignment control includes a layer of ferroelectric liquid crystal material sandwiched between a first transparent electrode and a second transparent electrode. The switchable half-wave plate also includes an electric field direction switching circuit configured to switch the electric field across the liquid crystal material between the forward direction and the reverse direction in response to a control signal. The switchable half-wave plate additionally includes an electric field magnitude control circuit to adjust the tilt angle in response to a signal received at a alignment control signal input. The ferroelectric liquid crystal-based light valve system according to the invention includes at least one ferroelectric liquid crystal-based spatial light modulator, an analyzer having a direction of minimum transmissivity, a ferroelectric liquid crystal-based switchable half-wave plate, and an adjustable voltage source. The voltage source is configured to adjust the magnitude of the electric field in at least one of the forward direction and reverse direction as the output voltage level is adjusted in response to a user interface or a light intensity sensor and a feedback circuit. The method of improving contrast in a ferroelectric light valve system according to the invention includes providing a ferroelectric liquid crystal-based spatial light modulator, an analyzer, a ferroelectric liquid crystal based switchable half-wave plate, and a video signal. In response to the video signal, a pixel electric field across each of the plurality of pixels is switched. Also an electric field across the switchable half-wave plate is periodically switched and the magnitude of the half-wave plate electric field is adjusted to align one of the first and the second half-wave plate director angles with one of the first and the second modulator director angles.

19 Claims, 15 Drawing Sheets

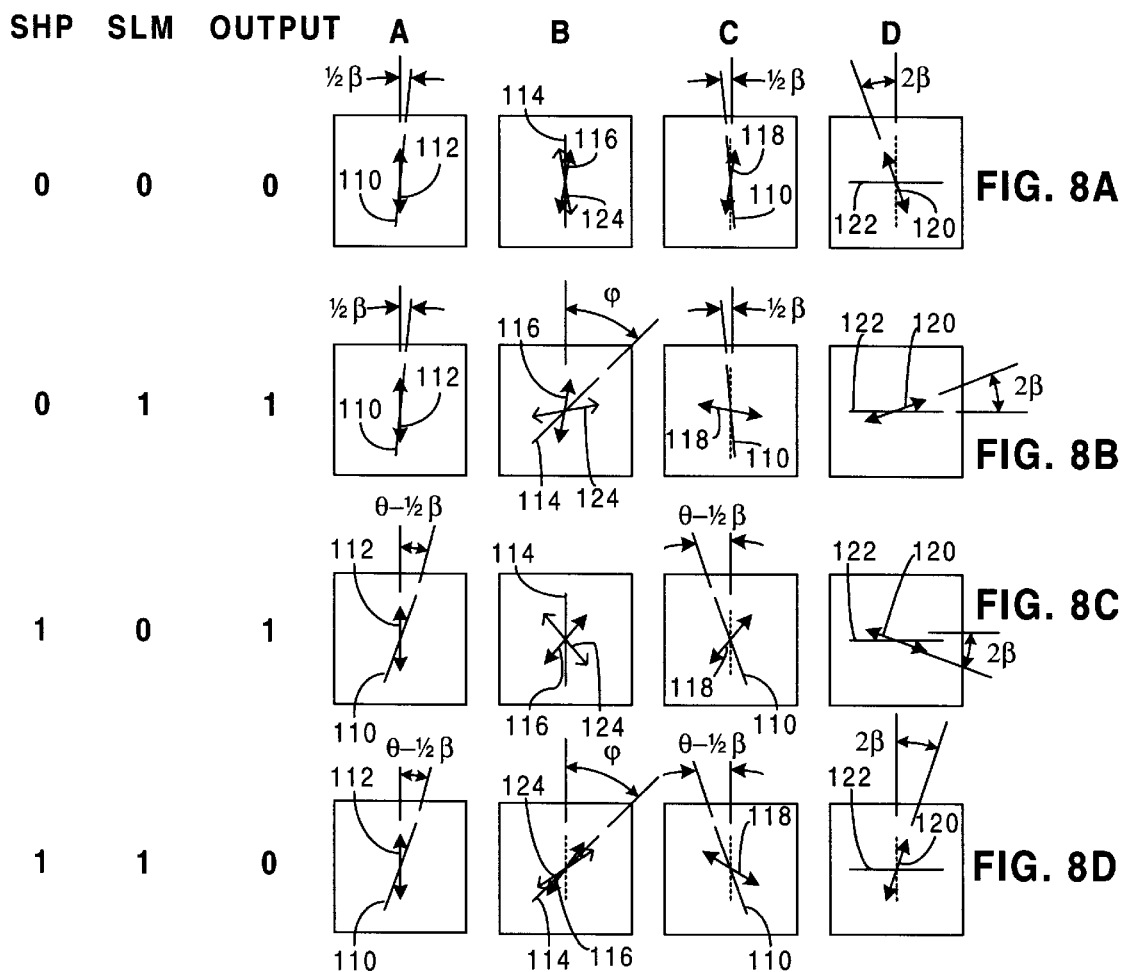

FERROELECTRIC LIQUID CRYSTAL LIGHT DOUBLER WITH TEMPERATURE AND VOLTAGE CONTROLLED TILT ANGLE

FIELD OF THE INVENTION

The invention relates to ferroelectric liquid crystal-based switchable half-wave plates and in particular to switchable half-wave plates with controlled tilt angle for improved contrast in light valve systems.

BACKGROUND OF THE INVENTION

A need exists for various types of video and graphics display devices with improved performance and lower cost. For example, a need exists for miniature video and graphics display devices that are small enough to be integrated into a helmet or a pair of glasses so that they can be worn by the user. Such wearable display devices would replace or supplement the conventional displays of computers and other devices. A need also exists for a replacement for the conventional cathode-ray tube used in many display devices including computer monitors, conventional and high-definition television receivers and large-screen displays. Both of these needs can be satisfied by display devices that incorporate a light valve that uses as its light control element one or more spatial light modulators, each based on a ferroelectric liquid crystal (FLC) material.

A FLC-based spatial light modulator is composed of a layer of a FLC material, preferably a surface-stabilized FLC material, sandwiched between a transparent electrode and a reflective electrode that is segmented into an array of pixel electrodes to define the picture elements (pixels) of the spatial light modulator. The reflective electrode is located on the surface of a silicon substrate that also accommodates the drive circuits that derive the drive signals for the pixel electrodes from an input video signal.

The direction of an electric field applied between each pixel electrode and the transparent electrode determines whether or not the corresponding pixel of the spatial light modulator rotates the direction of polarization of light reflected by the pixel. The reflective spatial light modulator is constructed as a quarter-wave plate so that the polarized light reflected by the pixels of the spatial light modulator is either rotated by 90° or not depending on the direction of the electric field applied to each pixel. A polarization analyzer is in the optical path of the light reflected by the spatial light modulator. The polarization analyzer is aligned to either: 1) transmit the polarized light which has rotated and absorb the polarized light which as not been rotated; or 2) transmit the polarized light which as not rotated and to absorb the polarized light which has been rotated. The resulting optical characteristics of each pixel of the spatial light modulator are binary: the light reflected by the pixel either is transmitted through the polarization analyzer (its 1 state) or is absorbed by the polarization analyzer (its 0 state), and therefore appears light or dark, depending on the direction of the electric field.

To produce the grey scale required for conventional display devices, the apparent brightness of each pixel is varied by temporally modulating the light transmitted by each pixel. The light is modulated by defining a basic time period that will be called the illumination period of the spatial light modulator. The pixel electrode is driven by a drive signal that switches the pixel from its 1 state to its 0 state. The duration of the 1 state relative to the duration of the illumination period determines the apparent brightness of the pixel.

Ferroelectric liquid crystal-based spatial light modulators suffer the disadvantage that, after each time the drive signal has been applied to a pixel electrode to cause the pixel to modulate the light passing through it, the DC balance of the pixel must be restored. This is typically done by defining a second basic time period called the balance period, equal in duration to the illumination period, and driving the pixel electrode with a complementary drive signal having 1 state and 0 state durations that are complementary to the 1 state and 0 state durations of the drive signal during the illumination period. The illumination period and the balance period collectively constitute a display period. To prevent the complementary drive signal from causing the display device to display a substantially uniform, grey image, the light source illuminating the light valve is modulated, either directly or with a shutter, so that the light valve is only illuminated during the illumination period, and is not illuminated during the balance period. However, modulating the light source as just described reduces the light throughput of the light valve to about half of that which could be achieved if DC balance restoration were unnecessary. This means that a light source of approximately twice the intensity, with a corresponding increase in cost, is necessary to achieve a given display brightness. Additionally or alternatively, projection optics with a greater aperture, also with a corresponding increase in cost, are necessary to achieve a given brightness.

One way this shortcoming can be overcome is the use of a switchable half wave plate also known as a light doubler. In the first of the two states, the 0 state, the switchable half-wave plate leaves the sense of operation of the light valve relative to the direction of the electric field applied to the liquid crystal material of the spatial light modulator unchanged. In the second of the two states, the 1 state, the switchable half-wave plate inverts the sense of operation of the light valve relative to the direction of the electric field applied to the liquid crystal material of the spatial light modulator. The light doubler is typically operated in the 0 state during the illumination period and in the 1 state during the balance period, during which the light source is not modulated (or modulated for only as long as it takes to switch between the 0 state and the 1 state).

Thus, the pixel electrode is driven with a complementary drive signal during the balance period and the DC balance of the pixel is restored. Since the light source is not modulated, light is transmitted by the pixel and its sense of operation is inverted by the switchable half-wave plate in the 1 state. This results in a pixel with the same apparent brightness during a balance period as during a illumination period. The apparent brightness of the pixel operated in conjunction with a switchable half-wave plate is therefore doubled during each display period FIG. 1 shows part of a conventional display device 5 incorporating a conventional reflective light valve system 10 that includes the reflective spatial light modulator 12 and a switchable half-wave plate 11. Other principal components of the light valve are the polarizer 14, the beam splitter 16 and the analyzer 18. The light valve is illuminated with light from the light source 20, the light from which is concentrated on the polarizer using a reflector 22 and collector optics 24. The light output by the light valve passes to the imaging optics 26 that focus the light to form an image (not shown). The light valve 10, light source 20 and imaging optics may be incorporated into various types of display device, including miniature, wearable devices, cathode-ray tube replacements, and projection displays.

Light generated by the light source 20 enters the light valve 10 by passing through the polarizer 14. The polarizer polarizes the light output from the light source. Alternatively, a polarized light source (not shown) can be used and the need for the polarizer 14 would be eliminated. The beam splitter 16 then reflects a fraction of the polarized light output from the polarizer towards the switchable half-wave plate 11. The beam splitter can additionally or alternatively be a polarizing beam splitter configured to reflect light having a direction of polarization parallel to the direction of polarization of the polarizer 14 towards the switchable half-wave plate 11. The switchable half-wave plate 11 then transmits the light to the spatial light modulator 12.

The spatial light modulator 12 is divided into a two-dimensional array of picture elements (pixels) that define the spatial resolution of the light valve 10. Light reflected from the spatial light modulator is again transmitted by the switchable half-wave plate 11, this time towards the beam splitter 16 which transmits a fraction of the reflected light to the analyzer 18. If the beam splitter is a polarizing beam splitter, however, only light having a direction of polarization orthogonal to the direction of polarization imparted by the polarizer will be transmitted and the need for an independent analyzer may be eliminated.

The direction of electric fields in each pixel of the spatial light modulator 12 and in the switchable half-wave plate 11 determines whether or not the direction of polarization of the light transmitted by the switchable half-wave plate towards the beam splitter is rotated by 90° relative to the direction of polarization of the incident light. The light reflected by each pixel of the spatial light modulator passes through the switchable half-wave plate 11, beam splitter 16, and the analyzer 18 and is then output from the light valve 10 through the imaging optics 26 depending on whether or not its direction of polarization was rotated by approximately 90° by the spatial light modulator and the switchable half-wave plate.

More specifically, the polarizer 14 polarizes the light generated by the light source 20 that passes through the collector optics 24 either directly or after reflecting off reflector 22. The polarization is preferably linear polarization. The beam splitter 16 reflects the polarized light output from the polarizer towards the switchable half-wave plate 11 which transmits the light on to the spatial light modulator 12. The polarized light reflected from the spatial light modulator transmits to the analyzer 18 through the switchable half-wave plate 11 and beam splitter 16. The direction of maximum transmission of the analyzer is orthogonal to that of the polarizer in this example.

For purposes of this description, the terms parallel and orthogonal will be used to describe directions of polarization and directions of maximum transmissivity and maximum reflectivity. When these terms are used within this description, it is understood that they relate to the optical characteristics of the light and of the various components that comprise the light valve and not necessarily to their spatial relationships. For example, when polarized light reflects from a mirror at an angle of incidence of 45°, the polarized light is reflected at an angle of 90° relative to the incident light. Even though the incident light and the reflected light are spatially orthogonal to one another, the direction of polarization of the reflected light will be optically unchanged from the direction of polarization of the incident light. Thus, the direction of polarization of the reflected light may be said to be parallel to the direction of polarization of the incident light. In addition, as used herein the term parallel shall include directions that are both parallel and anti-parallel, i.e., having a direction 180° opposed, to the original direction.

The switchable half-wave plate 11 is composed of a first transparent electrode 13 deposited on the surface of a first transparent cover 15, a second transparent electrode 17 deposited on the surface of a second transparent cover 19, and a ferroelectric liquid crystal layer 21 sandwiched between the first and the second transparent electrodes 13, 17. A drive circuit (not shown) applies a drive signal to the one of the first and second transparent electrodes 13, 17 ("driven transparent electrode"). The drive signal has two different voltage levels, and one of two driving schemes is typically used. In the first scheme, the transparent electrode that is not driven is maintained at a fixed potential mid-way between the voltage levels of the drive signal. In the second scheme, the transparent electrode that is not driven has the opposite of the two drive voltage levels of the drive signal applied to it than is applied to the driven transparent electrode. Thus the two different voltage levels of the drive signals are swapped between the first and the second transparent electrode 13, 17. The potential difference between the first and the second transparent electrode establishes an electric field across the liquid crystal layer 21.

The spatial light modulator 12 is composed of a transparent electrode 28 deposited on the surface of a transparent cover 30, a reflective electrode 32 located on the surface of the semiconductor substrate 34, and a ferroelectric liquid crystal layer 36 sandwiched between the transparent electrode 28 and the reflective electrode 32. The reflective electrode is divided into a two-dimensional array of pixel electrodes that define the pixels of the spatial light modulator and of the light valve. A substantially reduced number of pixel electrodes are shown to simplify the drawing. For example, in a light valve for use in a large-screen computer monitor, the reflective electrode could be divided into a two-dimensional array of 1600×1200 pixel electrodes. An exemplary pixel electrode is shown at 38. Each pixel electrode reflects the portion of the incident polarized light that falls on it towards the switchable half wave plate 11.

A drive circuit, which may be located in the semiconductor substrate 34, applies a drive signal to the pixel electrode 38 of each pixel of the spatial light modulator 12. An example of such a drive circuit 50 with signal processing electronics and an exemplary pixel is shown in FIG. 2. Regarding this figure and those that follow, it is noted that identical reference numerals are used to designate identical or similar elements throughout the several views, and that elements are not necessarily shown to scale. The drive circuit has external connections to a steady state voltage source with voltage level $V_{SS}$, ground, and a video signal 40. The drive circuit applies a drive signal to the pixel electrode 38 of each pixel of the spatial light modulator 12. The drive signal can be switched between two voltage levels, $V_{SS}$ and ground. The switching of the drive signal supplied to the pixel electrode 38 is controlled by the signal processing electronics 52 though two transistors $T_1$ and $T_2$ in response to a portion of the video signal 40. The gates of the two transistors are in electrical communication with the signal processing electronics at nodes $P+_1$ and $P-_1$, respectively. Other nodes are provided in the signal processing electronics for providing a drive signal to the remaining pixels (not shown).

Two matched resistors, R1 and R2, connected in series between $V_{SS}$ and ground, are used to provide a voltage level equal to $\frac{1}{2}V_{SS}$ between the resistors. An isolation amplifier A with unity gain has its input connected between the two matched resistors and its output connected to and the transparent electrode 28. The isolation amplifier ensures that the voltage level at the transparent electrode is maintained at ½$V_{SS}$ a fixed voltage level mid-way between the voltage levels of the drive signal. Without the isolation amplifier A, transient currents that occur at the transparent electrode when the drive signal at the pixel electrode 38 switches between $V_S$ and ground could affect the amount of the current drawn through one of the matched resistors and thus alter the voltage level between the resistors.

The potential difference between the pixel electrode and the transparent electrode establishes an electric field across the part of the liquid crystal layer 36 between the pixel and transparent electrodes. The direction of the electric field along with the direction of the electric field of the switchable half-wave plate 11 determines whether the liquid crystal layer rotates the direction of polarization of the light reflected by the pixel electrode, or leaves the direction of polarization unchanged.

Since light passes through the reflective spatial light modulator twice, once before and once after reflection by the reflective pixel electrodes, the reflective spatial light modulator 12 is structured as a quarter-wave plate. The thickness of the layer of ferroelectric liquid crystal material in the liquid crystal layer 36 is chosen to provide an optical phase shift of 90° between light polarized parallel to the director of the liquid crystal material and light polarized perpendicular to the director. The liquid crystal material is preferably a Smectic C* surface stabilized ferroelectric liquid crystal material having an angle of 22.5° between its director and the normal to its smectic layers. Reversing the direction of the electric field applied to such a liquid crystal material switches the director of the material through an angle ($\phi$) of about 45°.

Similarly, light passes through the switchable half-wave plate 11 twice, once before and once after reflection by the reflective spatial light modulator 12. The thickness of the layer of ferroelectric liquid crystal material in the liquid crystal layer 21 is preferably chosen to provide an optical phase shift of equal to half that of the spatial light modulator. In this case, the liquid crystal material is preferably a Smectic C* surface stabilized ferroelectric liquid crystal material having an angle of 11.25° between its director and the normal to its smectic layers. Reversing the direction of the electric field applied to such a liquid crystal material switches the director of the material through an angle ($\theta=\phi/2$) of about 22.5°.

FIGS. 3A–3E illustrate the actions of the switchable half-wave plate 11 and the spatial light modulator 12 on the direction of polarization of light passing through the light valve 10 at four different points along the optical path of the light valve and in the four possible combinations of the 0 and 1 states of the switchable half-wave plate and each of the spatial light modulators. The points along the optical path are marked A–D in the schematic view of the light valve shown in FIG. 6A. The points are the point A, where the polarized light received at the light input 106 enters the switchable half-wave plate 11 after reflection by the beam splitter 16; the point B, where the light transmitted through the switchable half-wave plate enters the spatial light modulator 12; the point C where the light reflected by the spatial light modulator enters the switchable half-wave plate; and the point marked D where the light transmitted by the switchable half-wave plate enters the beam splitter 16.

In the example shown, in the 0 states of the switchable half-wave plate 11 and the spatial light modulator 12, the director angle ("principle axis") 110 and 114 of these elements are both aligned parallel to the direction of maximum reflectivity of the beam splitter 16, which corresponds to the direction of polarization of the light received at the light input (the first direction). Moreover, the principle axis 110 of the switchable half-wave plate rotates through an angle of 22.5° and the principle axis 114 of the spatial light modulator rotates through an angle of 45° between the 0 state and the 1 state of these elements.

FIG. 3B shows the actions of the switchable half-wave plate 11 and the spatial light modulator 12 when both are in their 0 states. In this state, the principal axes 110 and 114 of the switchable half-wave plate 102 and the spatial light modulator 12, respectively, are both parallel to the direction of maximum reflectivity of the beam splitter 16. Consequently, the direction of polarization 112 of the light received at the light input 106 and reflected by the beam splitter is parallel to the principal axis 110 of the switchable half-wave plate in its 0 state, as shown at A. The switchable half-wave plate therefore transmits the light received at the light input without changing the direction of polarization of this light.

The direction of polarization 116 of the light transmitted by the switchable half-wave plate 11 is parallel to the principal axis 114 of the spatial light modulator 12 in its 0 state, as shown at B. The spatial light modulator therefore reflects the light transmitted by the switchable half-wave plate without changing the direction of polarization of this light.

The direction of polarization 118 of the light reflected by the spatial light modulator 12 is parallel to the principal axis 110 of the switchable half-wave plate 11 in its 0 state, as shown at C. The switchable half-wave plate therefore transmits the light reflected by the spatial light modulator without changing the direction of polarization of this light.

The direction of polarization 120 of the light transmitted by the switchable half-wave plate 11 is orthogonal to the direction of maximum transmissivity 122 of the beam splitter 16, as shown at D. The beam splitter reflects the light transmitted by the switchable half-wave plate away from the light output 108, so that the pixel appears dark when viewed from the light output.

FIG. 3C shows the actions of the switchable half-wave plate 11 and the spatial light modulator 12 when the switchable half-wave plate is in its 0 state and the spatial light modulator is in its 1 state. In this state, the principal axis 110 of the switchable half-wave plate 11 is parallel to, and the principal axis of the spatial light modulator 12 is at an angle of $\phi=45°$ to the direction of maximum reflectivity of the beam splitter 16. Consequently, the direction of polarization 112 of the light received at the light input 106 and reflected by the beam splitter is parallel to the principal axis 110 of the switchable half-wave plate in its 0 state, as shown at A. The switchable half-wave plate therefore transmits the light received at the light input without changing the direction of polarization of this light.

The direction of polarization 116 of the light transmitted by the switchable half-wave plate 11 is at an angle of 45° to the principal axis 114 of the spatial light modulator 12 in its 1 state, as shown at B. The spatial light modulator therefore rotates the direction of polarization of the light transmitted by the switchable half-wave plate through 90° when it reflects this light. The direction of polarization of the light at B after reflection is indicated at 124.

The direction of polarization 118 of the light reflected by the spatial light modulator 12 is at an angle of 90° to the principal axis 110 of the switchable half-wave plate 11 in its 0 state, as shown at C. The switchable half-wave plate therefore leaves the direction of polarization of the light reflected by the spatial light modulator unchanged when it transmits this light.

The direction of polarization 120 of the light transmitted by the switchable half-wave plate 11 is parallel to the direction of maximum transmissivity 122 of the beam splitter 16, as shown at D. The beam splitter therefore transmits the light transmitted by the switchable half-wave plate to the light output 108, and the pixel appears bright when viewed from the light output.

FIG. 3D shows the actions of the switchable half-wave plate 11 and the spatial light modulator 12 when the switchable half-wave plate is in its 1 state and the spatial light modulator is in its 0 state. In this state, the principal axis 110 of the switchable half-wave plate 11 is at an angle of θ=22.5° to, and the principal axis of the spatial light modulator 12 is parallel to, the direction of maximum reflectivity of the beam splitter 16. Consequently, the direction of polarization 112 of the light received at the light input 106 and reflected by the beam splitter is at an angle of 22.5° to the principal axis 110 of the switchable half-wave plate in its 1 state, as shown at A. The switchable half-wave plate therefore rotates the direction of polarization of the light received at the light input through 45° when it transmits this light.

The direction of polarization 116 of the light transmitted by the switchable half-wave plate 11 is aligned at an angle of 45° to the principal axis 114 of the spatial light modulator 12 in its 0 state, as shown at B. The spatial light modulator therefore rotates the direction of polarization of the light transmitted by the switchable half-wave plate through 90° when it reflects this light. The direction of polarization of the light at B after reflection is indicated at 124.

The direction of polarization 118 of the light reflected by the spatial light modulator 12 is at an angle of 67.5° to the principal axis 110 of the switchable half-wave plate 11 in its 1 state, as shown at C. The direction of polarization shown at 118 is the mirror image of the direction of polarization shown at 124 because the view in C is in the opposite direction to the view in B. The switchable half-wave plate therefore rotates the direction of polarization of the light reflected by the spatial light modulator though 135° when it transmits this light.

The direction of polarization 120 of the light transmitted by the switchable half-wave plate 11 is parallel to the direction of maximum transmissivity 122 of the beam splitter 16, as shown at D. The beam splitter therefore transmits the light transmitted by the switchable half-wave plate to the light output 108, and the pixel appears bright when viewed from the light output.

FIG. 3E shows the actions of the switchable half-wave plate 11 and the spatial light modulator 12 when both are in their 1 states. In this state, the principal axis of the switchable half-wave plate 11 is at an angle of θ=22.5° to, and the principal axis of the spatial light modulator 12 is at an angle of φ=45° to the direction of maximum reflectivity of the beam splitter 16. Consequently, the direction of polarization 112 of the light received at the light input 106 and reflected by the beam splitter 16 is at an angle of 22.5° to the principal axis 110 of the switchable half-wave plate in its 1 state, as shown at A. The switchable half-wave plate therefore rotates the direction of polarization of the light received at the light input through 45° when it transmits this light.

The direction of polarization 116 of the light transmitted by the switchable half-wave plate 11 is parallel to the principal axis 114 of the spatial light modulator 12 in its 1 state, as shown at B. The spatial light modulator therefore reflects the light transmitted by the switchable half-wave plate without changing the direction of polarization of this light. The direction of polarization of the light at B after reflection is indicated at 124, which coincides in direction with 116.

The direction of polarization 118 of the light reflected by the spatial light modulator 12 is at an angle of 22.5° to the principal axis 110 of the switchable half-wave plate 11 in its 1 state, as shown at C. The direction of polarization shown at 118 is the mirror image of the direction of polarization shown at 124 because the view in C is in the opposite direction to the view in B. The switchable half-wave plate therefore rotates the direction of polarization of the light reflected by the spatial light modulator though 45° when it transmits this light.

The direction of polarization 120 of the light transmitted by the switchable half-wave plate 11 is orthogonal to the direction of maximum transmissivity 122 of the beam splitter 16, as shown at D. The beam splitter therefore reflects the light transmitted by the switchable half-wave plate away from the light output 108, so that the pixel appears dark when viewed from the light output.

It can be seen by comparing FIGS. 3B and 3D that, when a spatial light modulator 12 is in its 0 state, the direction of polarization of the light impinging on the beam splitter 16 after reflection from the spatial light modulator is orthogonal to (pixel dark) and parallel to (pixel bright) the direction of maximum transmissivity 122 when the switchable half-wave plate is in its 0 state and in its 1 state, respectively. Similarly, it can be seen by comparing FIGS. 3C and 3E that, when a spatial light modulator is in its 1 state, the direction of polarization of the light impinging on the beam splitter after reflection from the spatial light modulator is parallel to (pixel bright) and orthogonal to (pixel dark) the direction of maximum transmissivity when the switchable half-wave plate is in its 0 state and in its 1 state, respectively. The duration of the 1 state of the spatial light modulator during the illumination period is the same as the duration of the 0 state during the following balance period. However, changing the state of the switchable half-wave plate between the illumination period and the balance period inverts the sense of the light valve 10 relative to the direction of the electric field applied to the liquid crystal material of the spatial light modulator 12. Consequently, the direction of polarization of the light incident on the beam splitter is at the same angle relative to the direction of maximum transmissivity during the same temporal portion of both the illumination period and the balance period.

In a miniature, wearable display, the imaging optics 26 are composed of an eyepiece that receives the light reflected by the reflective electrode 32 and forms a virtual image at a predetermined distance in front of the user (not shown). In a cathode-ray tube replacement or in a projection display, the imaging optics are composed of projection optics that focus an image of the reflective electrode on a transmissive or reflective screen (not shown). Optical arrangements suitable for use as an eyepiece or projection optics are well known in the art and will not be described here.

Since the direction of maximum transmission of the analyzer 18 is orthogonal to the direction of polarization defined by the polarizer 14, light whose direction of polarization has been rotated through 90° by a pixel of the spatial light modulator 12 in combination with the switchable half-wave plate 11 will pass through the analyzer and be output from the light valve 10 whereas light whose direction of polarization has not been rotated will not pass through the analyzer. The analyzer only transmits to the imaging optics 26 light whose direction of polarization has been rotated by pixels of the spatial light modulator in combination with the switchable half-wave plate. The pixels of the spatial light modulator will appear bright or dark depending on the direction of the electric field applied to each pixel and the direction of the electric field in the switchable half-wave plate. When a pixel appears bright, it will be said to be in its 1 output state, and when the pixel appears dark, it will be said to be in its 0 output state.

The direction of maximum transmission of the analyzer 18 can alternatively be arranged parallel to that of the polarizer 14, and a non-polarizing beam splitter can be used as the beam splitter 16. In this case, the spatial light modulator 12 operates in the opposite sense to that just described. Another possible configuration that eliminates the beam splitter 16 altogether is shown in FIG. 4. In this configuration, the light source 20, collector optics 24, and polarizer 14 are arranged linearly, but at an angle to the reflective spatial light modulator 12. Thus, light reflects from the spatial light modulator at an angle opposite the angle of incidence towards the analyzer 18 and imaging optics 26. The switchable half-wave plate 11 is positioned to both transmit light to the spatial light modulator 12 from the polarizer 14 and to transmit light reflected from the spatial light modulator towards the analyzer 18.

To produce the grey scale required by a display device notwithstanding the binary optical characteristics of the pixels of the light valve 10, the apparent brightness of each pixel is varied by temporally modulating the light reflected by the pixel, as described above. The drive circuit 50 like that shown in FIG. 2, for each pixel of the spatial light modulator determines the duration of the 1 state of the pixel in response to a portion of the input video signal 40 corresponding to the location of the pixel in the spatial light modulator.

FIGS. 5A–5F illustrate the operation the light valve 10 shown in FIG. 1 utilizing an exemplary pixel controlled by the pixel electrode 38, in spatial light modulators 12 during three exemplary frames of the input video signal 40. Each of the display periods corresponds to one frame of the input video signal and is composed of an illumination period (ILLUM) and a balance period (BALANCE) having equal durations, as shown in FIG. 5A.

FIG. 5B shows the drive signal applied to the pixel electrode 38. During the balance period, the level of each drive signal is 0 and $V_{SS}$ for times equal to the times that it was at $V_{SS}$ and 0, respectively, during the illumination period, so that the electric field applied to the liquid crystal material of the pixel averages to zero over the display period.

FIG. 5C shows the state of the switchable half-wave plate 11. In the 0 state, the direction of the principal axis of the switchable half-wave plate is aligned parallel to the direction of polarization of the polarizer 14. This corresponds to the direction of maximum reflectivity of the beam splitter 16. As a result, the direction of polarization of the light generated by the light source remains unchanged after passing though the switchable half-wave plate in its 0 state. Thus, when the light that has passed through the switchable half-wave plate in its 0 state impinges on the spatial light modulator 12, its direction of polarization is parallel to the principal axis of any of the spatial light modulators that are in the 0 state, and is at an angle of $\phi=2\theta$ to the principal axis of any of the spatial light modulators that are in the 1 state.

In the 1 state of the switchable half-wave plate 11, the direction of the principal axis is at the non-zero angle $\theta$ to the direction of polarization of the incident light. The value of $\theta$ is discussed above. As a result, the direction of polarization of the light from the light source 20 and polarized by polarizer 14 is rotated through an angle of $2\theta$ by passing though the switchable half-wave plate in this state. Thus, when the light that has passed through the switchable half-wave plate in its 1 state impinges on the spatial light modulator 12, its direction of polarization is at an angle of $\phi=2\theta$ to the principal axis of the spatial light modulator in the 0 state, and is parallel to the principal axis of the spatial light modulator in the 1 state.

FIG. 5D shows the combined effect of the pixel electrode 38 and the switchable half-wave plate 11 on the direction of polarization of the light impinging on the beam splitter 16 after reflecting from the pixel electrode 38 and passing through the switchable half-wave plate 11 a second time. The direction of polarization is indicated by the absolute value of the angle $\alpha$ between direction of polarization of the light impinging on the beam splitter and the direction of maximum transmissivity of the beam splitter. The beam splitter transmits light having an angle $\alpha$ close to zero and reflects light having an angle $\alpha$ close to 90°. In this Figure, the light source 20 is unmodulated to show the timing of the changes in the direction of polarization of the light impinging on the beam splitter.

FIG. 5E shows the modulation of the light generated by the light source 20. The light source is ON throughout most the illumination period and most of the balance period of each display period, and is OFF only during the brief periods during which the switchable half-wave plate 11 is changing state.

FIG. 5F show the light output from the light valve 10 after having been reflected by the pixel electrode 38. The durations of the temporal portions of both the illumination period and the balance period of each display period during which light is output are the same. Since the light source 20 is modulated as shown in FIG. 5F, the light valve is not illuminated during the switching transients of the switchable half-wave plate 11. The remaining pixels operate similarly.

The light valve 10 shown in FIG. 1 can also be adapted to provide a colored light output to the imaging optics 26. One way that this can be done is by replacing the "white" light source 20 with three colored light sources such as a red, blue and green LEDs (not shown), each illuminating the spatial light modulator 12 sequentially. This would require a balance period after each sequential illumination period. Another way that a colored light output can be provided is by replacing the single reflective spatial light modulator 12 shown in FIG. 1 with three reflective spatial light modulators and a color separator for separating the light into three component colors.

An example of one such color configuration is depicted in FIG. 6. In this figure, the color separator is a series of three dichroic plates 42, 43, 44, each having an associated reflective spatial light modulator 12. Each of the dichroic plates is configured to reflect light in a band of wavelengths (colorband) particular to that dichroic plate and to pass the remaining wavelengths of light. Thus, if the light source 20 is a "white" light, emitting visible light across the entire visible color spectrum, a particular portion of the color spectrum may be reflected by each dichroic plate its associated reflective spatial light modulator simultaneously. This eliminates the need for sequential illumination and improves the perceived brightness of the color pixels passing through the analyzer.

For example, the dichroic plate 42 nearest the beam splitter 16 might reflect red-colored light toward its associated spatial light modulator 12 while the center dichroic plate 43 reflects green-colored light toward its associated spatial light modulator and the dichroic plate remote from the beam splitter 44 reflects blue-colored light towards its spatial light modulator. When the light source 20 is ON, as shown if FIG. 6, the colored light reflected by the dichroic plates passes to each of the three reflective spatial light modulators 12. Each of the three reflective spatial light modulators is capable of reflecting pixels of the colored light back at its associated dichroic plate in a manner consistent with the above description of the operation of the spatial light modulator shown in FIG. 1.

The majority of the colored light reflected by each of the spatial light modulators 12 will be reflected by its associated dichroic plate toward the analyzer 18 since the light reflected by each spatial light modulator will retain the characteristic wavelengths of light originally reflected by its respective dichroic plate. When the combined colored light from each of the three reflective spatial light modulators 12 passes through the analyzer, a full color image can be formed by the imaging optics 26.

Whether the light valve includes a single spatial light modulator 12 or three, it is important that a high contrast ratio between the 1 output state and the 0 output state be maintained. The ratio of the intensity of light transmitted in the 1 state to the intensity of light transmitted in the 0 state is known as the "contrast ratio" or simply as "contrast." A contrast ratio of at least 100:1 is required for excellent image quality and is usually found in CRT based displays. The precise alignment of the direction of polarization of light reflected from each pixel and passing through the switchable half-wave plate either parallel to or orthogonal to the direction of maximum transmissivity of the analyzer 18 (or a polarizing beam splitter) is of critical importance in order to maintain the high contrast ratio. Even slight misalignment will cause the a portion of the light which should be transmitted by the analyzer 18 in the 1 state to be absorbed (or reflected) and a portion of the light which should be absorbed (or reflected) by the analyzer (or polarizing beam splitter) in the 0 state to be transmitted. Light transmitted through the analyzer in the 0 state is known as "dark state luminance" and significantly influences image quality and quickly drives the contrast ratio down.

The precise alignment of the direction of polarization reflected by the pixels and passing through the switchable half-wave plate 11 is affected by a number of mechanical tolerances encountered during the assembly of the light valve 10. Tolerances in the mechanical alignment of the polarizer 14, the spatial light modulator 12, the switchable half-wave plate 11, and the analyzer 18 are typically plus or minus one-half degree and contribute to misalignment. In addition, during assembly of the spatial light modulator 12, the angle at which the normal to the smectic layers of the ferroelectric liquid crystal material 36 is aligned relative to the substrate 34 (pre-alignment angle) has a tolerance that is also typically plus or minus one-half degree that may contribute to misalignment. Similar misalignment may occur during assembly of the switchable half-wave plate. Once the light valve 10 is assembled, these tolerances result in a permanent fixed offset.

In addition to the permanent fixed offset, however, the direction of polarization of light reflected from the pixels and transmitted through the switchable half-wave plate is affected by variations in the tilt angle of the ferroelectric liquid crystal material with temperature change. Tilt angle is the angle that the director of the ferroelectric liquid crystal material switches through when the direction of the electric field across the ferroelectric liquid crystal material is reversed. The tilt angle is symmetric around the pre-alignment angle. Thus, if the director of the liquid crystal material at a particular temperature forms an angle of 22.5° with the normal to its smectic layers when exposed to an electric field having a forward direction, the director switches through a tilt angle of 45° when the direction of the electric field reverses. Tilt angle usually changes by between one and two degrees during a change from room temperature to operating temperature of the spatial light modulator. Operating temperature for a spatial light modulator is typically 60° C. with the increase in temperature coming from heat generated by the operation of the drive circuits 50 and the absorption of energy from the light illuminating the spatial light modulator.

FIGS. 7A and 7B show how variations in tilt angle with temperature affect operation of the light valve. The switchable half-wave plate is not shown in these figures for clarity. FIG. 7A depicts an analyzer 18 and a ferroelectric liquid-crystal-based spatial light modulator 12 at room temperature, such as when a light valve is first turned on. FIG. 7B shows the same analyzer and spatial light modulator at normal operating temperature. The direction of maximum transmissivity of the analyzer is indicated in both figures by line 54 with closed arrow heads, while the orthogonal direction of minimum transmissivity is shown by the line 56 with open arrow heads. The direction of polarization of light reflected by pixels having an electric field in the forward direction is depicted in both figures by line 58 with closed arrow heads. The direction of polarization of light reflected by pixels having an electric field in the reverse direction is depicted in both figures by line 60 with closed arrow heads.

In FIG. 7A, the angle between the direction of polarization of the light reflected from pixels having a forward electric field and pixels having a reverse electric field is indicated as a room temperature angle (RTA) greater than 90°. While RTA would actually be only slightly greater than 90°, its magnitude has been exaggerated in the figure for clarity. The slight misalignment between the direction of polarization of light reflected from the spatial light modulator 58, 60 and the direction of maximum or minimum transmissivity of the analyzer 54, 56 reduces the contrast ratio of the light valve. The misalignment between the direction of polarization of light having a direction 60 and the direction of minimum transmissivity 56 has a substantially greater effect on the contrast ratio than does the misalignment between the direction of polarization of light having a direction 58 and the direction of maximum transmissivity 54.

In FIG. 7B, the angle between the direction of polarization of the light reflected from pixels having a forward electric field and pixels having a reverse electric field is indicated as an operating temperature angle (OTA) less than 90°. While OTA would actually be only slightly less than 90°, its magnitude has been exaggerated in the figure for clarity. Again, the slight misalignment between the direction of polarization of light reflected from the spatial light modulator 58, 60 and the direction of maximum or minimum transmissivity of the analyzer 54, 56 reduce the contrast ratio of the light valve. In this case, the performance of the light valve at neither room temperature or operating temperature is optimal, but a compromise exists so the performance at room temperature is not noticeably worse than it is at room temperature.

The problem of change in tilt angle change and of misalignment is amplified when a switchable half-wave plate is used because the optical path encounters this misalignment twice, once on the way to the special light modulator and once after being reflected by the spatial light modulator. Thus, a difference (β) between the angle θ through which the principal axis of the switchable half-wave plate 11 switches and one-half of the actual angle φ through which the principal axis of the spatial light modulator 12 switches ultimately causes an offset in the alignment angle equal to twice the difference (2β). This reduces the contrast ratio of the light valve 10 more than other misalignments in the light valve system. For example, a difference between θ and φ/2 of less than about ±3.5° is required to provide a contrast of 20 dB (10:1), and a difference of less than about ±1.5° is required to provide a contrast of 40 dB (100:1).

An example of this is depicted in FIGS. 8A–8D which are similar to FIGS. 3B–3E but with an indicated offset equal to the difference (β). Since the difference (β) is subtracted from the tilt angle in our example, a ½β change is shown for each of the director angles. The 2β error which results is clearly indicated in column D for each possible combination of electric field directions.

One item that tends to introduce this difference (β) between the angle θ through which the principal axis of the switchable half-wave plate 11 switches and one-half of the actual angle φ through which the principal axis of the spatial light modulator 12 switches, is the change of tilt angle with temperature change. The spatial light modulator 12 and the switchable half wave plate 11 tend to heat at different rates and the spatial light modulator also tends to have a higher normal operating temperature. This causes a changes in the tilt angles at different rates for the spatial light modulator and the switchable half-wave plate. Manufacturers have attempted to correct this problem by installing heater circuits in the switchable half-wave plate, but temperature of the switchable half wave plate must be maintained within ±2° C. of the spatial light modulator in order to maintain a good contrast ratio. This temperature tolerance is very difficult to achieve at a product level.

In addition, heaters do not offer the dynamic minute to minute adjustment of contrast control that may be appropriate, especially during warmup, nor do they offer a user the ability to adjust contrast. Consequently, what is needed is a light valve system with instantaneous correction of tilt angle in the switchable half-wave plate and the ability for a user to change contrast settings.

SUMMARY OF THE INVENTION

The invention provides a ferroelectric liquid crystal-based switchable half-wave plate with improved alignment control, a ferroelectric liquid crystal-based light valve system with improved contrast control, and a method of improving contrast in a ferroelectric liquid crystal-based light valve system.

The switchable half-wave plate with improved alignment control includes a first transparent electrode, a second transparent electrode, and a layer of ferroelectric liquid crystal material sandwiched between the first transparent electrode and the second transparent electrode. The ferroelectric liquid crystal material defines a director having a first angle when an electric field between the first transparent electrode and the second transparent electrode has a forward direction, and having a second angle when the electric field has a reverse direction. The director has a second angle when the electric field has a reverse direction.

An electric field direction switching circuit is in electrical communication with at least one of the first transparent electrode and the second transparent electrode. The switching circuit configured to switch the electric field between the forward direction and the reverse direction in response to the control signal. Finally, the switchable half-wave plate includes an electric field magnitude control circuit in electrical communication with at least one of the first transparent electrode, the second transparent electrode, and the electric field direction switching circuit. The magnitude control circuit, possibly in conjunction with a heater, adjusts at least one of the first angle and the second angle in response to a signal received at a alignment control signal input. The magnitude control circuit may receive input signals from an user input or from a feedback circuit with a light intensity sensor.

The ferroelectric liquid crystal-based light valve system according to the invention includes at least one ferroelectric liquid crystal-based spatial light modulator, an analyzer having a direction of minimum transmissivity, and ferroelectric liquid crystal-based switchable half-wave plate located along an optical path between the at least one spatial light modulator and the analyzer. The switchable half-wave plate includes a first transparent electrode, a second transparent electrode, ferroelectric liquid crystal material sandwiched between the first transparent electrode and the second transparent electrodes, and a switching circuit. The switching circuit is in electrical communication with at least one of the first transparent electrode and the second transparent electrode, the switching circuit configured to switch an electric field across the ferroelectric liquid crystal material between a forward direction and a reverse direction.

A voltage source having an adjustable output voltage level is in electrical communication with at least one of the switching circuit, the first transparent electrode and the second transparent electrode. The voltage source is configured to adjust the magnitude of the electric field in at least one of the forward direction and reverse direction as the output voltage level is adjusted. The output voltage may be adjusted in response to a user interface or a light intensity sensor and a feedback circuit. The light intensity sensor may be positioned to be illuminated by light having a direction of polarization close to parallel with the direction of minimum transmissivity that passes through the analyzer.

The method of improving contrast in a ferroelectric light valve system according to the invention begins by providing a ferroelectric liquid crystal-based spatial light modulator including a plurality of pixels. Next an analyzer having a direction of minimum transmissivity is provided, as is a ferroelectric liquid crystal based switchable half-wave plate along an optical path between the spatial light modulator and the analyzer. Next, a video signal is provided to the spatial light modulator. In response to the video signal, a pixel electric field across each of the plurality of pixels is switched independently between a forward direction corresponding to a first modulator director angle, and a reverse direction corresponding to a second modulator director angle. Also, an electric field across the switchable half-wave plate is periodically switched between a front direction corresponding to a first half-wave plate director angle, and a backward direction corresponding to a second half-wave plate director angle. Next, the magnitude of the half-wave plate electric field is adjusted to align one of the first and the second half-wave plate director angles with one of the first and the second modulator director angles.

Accordingly, the invention provides a light valve system with contrast control and the method of controlling contrast in a light valve system. Other features and advantages of the present invention will become apparent from the following detailed description, taken in conjunction with the accompanying drawings, illustrating, by way of example, the principles of the invention.

BRIEF DESCRIPTION OF THE DRAWINGS

FIGS. 8A–8D is illustrates the additive effect of offset tilt angle in a switchable half-wave plate.

DETAILED DESCRIPTION OF THE INVENTION

The invention is based, in part, on the concept that the tilt angle of ferroelectric liquid crystal material can be influenced by changes in the magnitude of the electric field across the ferroelectric liquid crystal material. While the change in tilt angle achieved by changing the magnitude of the electric field are not enough for grayscale control, they can be used to adjust the contrast ratio in ferroelectric liquid crystal-based light valve systems.

The magnitude of an electric field across the ferroelectric liquid crystal material is proportional to the difference in voltage levels between two electrode between which it is sandwiched. The difference in voltage levels is typically between 1.6 volts and 2.5 volts which is one-half of standard 3.3 volt and 5 volt power supplies, but switching of ferroelectric liquid crystals can occur with a difference in voltage levels as low as 0.2 volt and as high as 25. With switchable half-wave plates, these voltage levels are typically derived from standard power supplies using a drive circuit that switches the voltage level one of the transparent electrodes between the constant voltage supply level ($V_{SS}$) and ground while the other transparent electrode is held at a voltage level of one-half the voltage supply level ($\frac{1}{2}V_{SS}$). In an alternative drive circuit, the voltage level supplied to each of the transparent electrodes (e.g., $V_{SS}$ and ground) can simply be swapped. Thus, the magnitude of the electric field across the ferroelectric liquid crystal material is typically fixed, and its direction is switched from forward to reverse.

Changing the difference between the voltage levels of the two transparent electrodes results in a slight change in tilt angle of the ferroelectric liquid crystal material sandwiched between them. The change in tilt angle is typically about 2 degrees for each one-half volt change in the difference between the voltage levels of the pixel electrode and the transparent electrode.

The switchable half-wave plate, the light valve system, and the method of controlling contrast in a light valve system according to the invention are all generally based on the concept that tilt angle controlled by using a variable voltage level source to drive the electric field across the ferroelectric liquid crystal material of the switchable half-wave plate instead of a fixed voltage level source.

Figure 9:
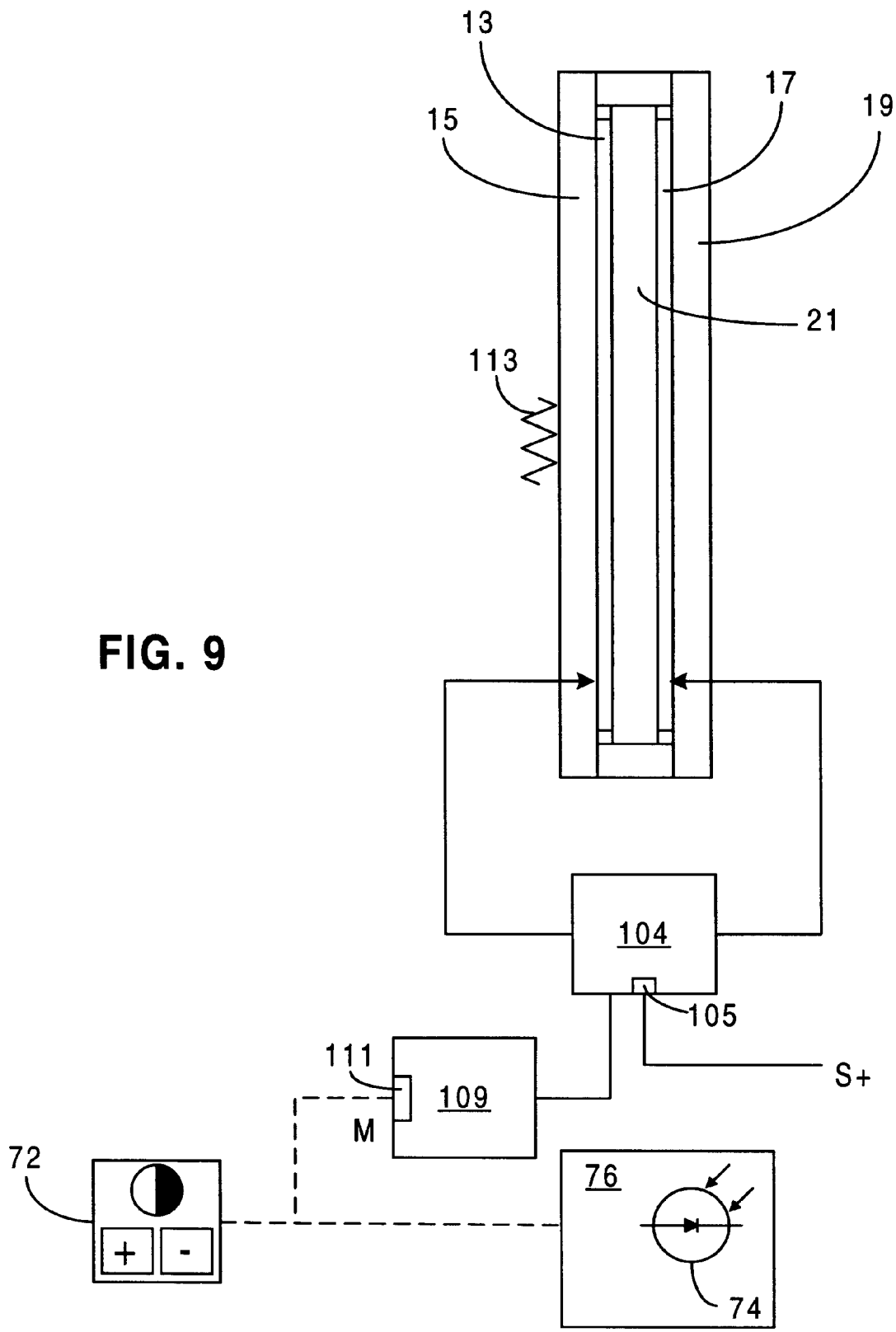
FIG. 9 is a schematic diagram of a switchable half-wave plate according to the invention.

FIG. 9 depicts the ferroelectric liquid crystal-based switchable half wave plate 52 according to the invention. Regarding this figure and those that follow, it is noted that identical reference numerals are used to designate identical or similar elements throughout the several views, and that elements are not necessarily shown to scale. The ferroelectric liquid crystal-based switchable half-wave plate with improved alignment control includes a first transparent electrode 13, a second transparent electrode 17, and a layer of ferroelectric liquid crystal material 21 sandwiched between the first transparent electrode and the second transparent electrode. The liquid crystal material in the switchable half-wave plate 52 is preferably a Smectic C* surface stabilized ferroelectric liquid crystal material. The thickness of the layer of ferroelectric liquid crystal material in the liquid crystal layer 21 is preferably chosen to provide an optical phase shift equal to half that of one or more spatial light modulators (not shown this figure) with which the switchable half-wave plate is optimized to work. Typically, the principal axis of each of the spatial light modulators switches through an angle ($\phi$) of 45°, which rotates the direction of polarization of the light reflected by the spatial light modulators by 90°. Thus, the thickness of the layer of ferroelectric liquid crystal material in the liquid crystal layer 21 of the switchable half-wave plate 52 would typically be chosen so the principal axis, sometimes called the angle of the director, of the switchable half-wave plate switches through an angle ($\theta$), also known as the tilt angle, of 22.5°, or any odd integral multiple of 22.5°. Similarly, if the principal axis of each of the spatial light modulators actually switch through 44°, which rotates the direction of polarization of the light reflected by the spatial light modulators by 88°, the value of $\theta$ should be 22.0°.

Generally, the director (not shown this figure) defined by the ferroelectric liquid crystal material 21 has a first angle when an electric field (not shown) between the first transparent electrode and the second transparent electrode has a forward direction and a second angle with the electric field has a reverse direction. For purposes of this description, a forward electric field is one formed when the voltage level at the first transparent electrode 13 is higher than the voltage level at the second transparent electrode 17. Similarly, a reverse direction electric field is formed when the voltage level at the first transparent electrode 13 is lower than the voltage level at the second transparent electrode 17.

The switchable half-wave plate 52 according to the invention also includes an electric field direction switching circuit 104 in electrical communication with at least one of the first transparent electrode 13 and the second transparent electrode 17. Examples of two types of electric field direction switching circuits 104 are shown in FIGS. 10A and 10B, respectively.

Figure 10A:
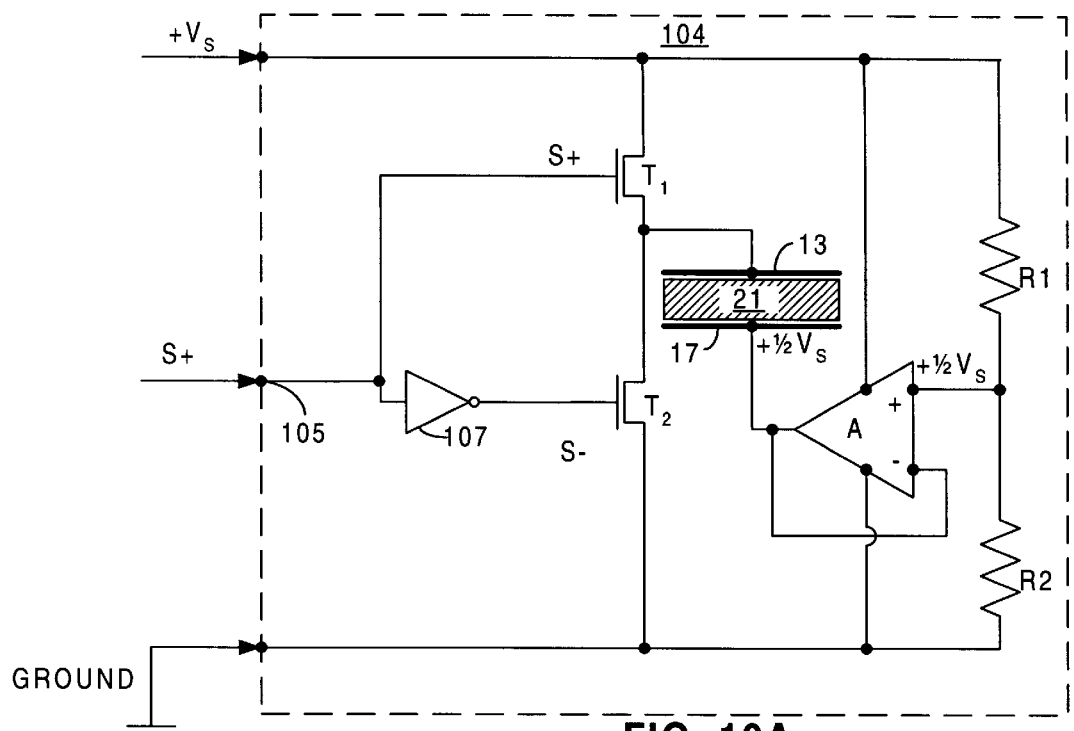
FIGS. 10A–10B are electric field switching circuits for a switchable half-wave plate according to the invention.

FIG. 10A depicts an electric field direction switching circuit that switches the voltage of the first transparent electrode 13 between a first voltage level ($V_S$) received from a voltage source (not shown) and a second voltage level (ground) in response to a control signal (S+) received at control signal input 105. The second transparent electrode 17 is maintained at a third voltage level (½$V_S$) midway between first voltage level and the second voltage level ($V_S$). The second transparent electrode 17 receives the third voltage level (½$V_S$) from an isolation amplifier A with unity gain. The isolation amplifier A has an input connected to a point between two matched resistors (R1, R2) connected in series between a point in the circuit at the first voltage level (ground) and a point in the circuit at the second voltage level ($V_S$). The isolation amplifier prevent transient currents at the transparent electrode 17 from affecting the third voltage level (½$V_S$).

The control signal (S+) is provided to the gate of transistor $T_1$. At the same time, the control signal (S+) is inverted by inverter 107, and the inverted control signal (S−) is provided to the gate of transistor $T_2$. Thus, when the control signal (S+) is in a high state corresponding to a logical "1", the transistor $T_1$ connects the first transparent electrode to the first voltage level ($V_S$). At the same time, the inverted signal (S−) is in a low state corresponding to a logical "0", and transistor $T_2$ disconnects the first transparent electrode from the second voltage level (ground). When the control signal (S+) switches to a low state corresponding to a logical "0", the transistor $T_1$ disconnects the first transparent electrode from the first voltage level ($V_S$). At the same time, the inverted signal (S−) is in a high state corresponding to a logical "1", and transistor $T_2$ connects the first transparent electrode to the second voltage level (ground).

Figure 10B:
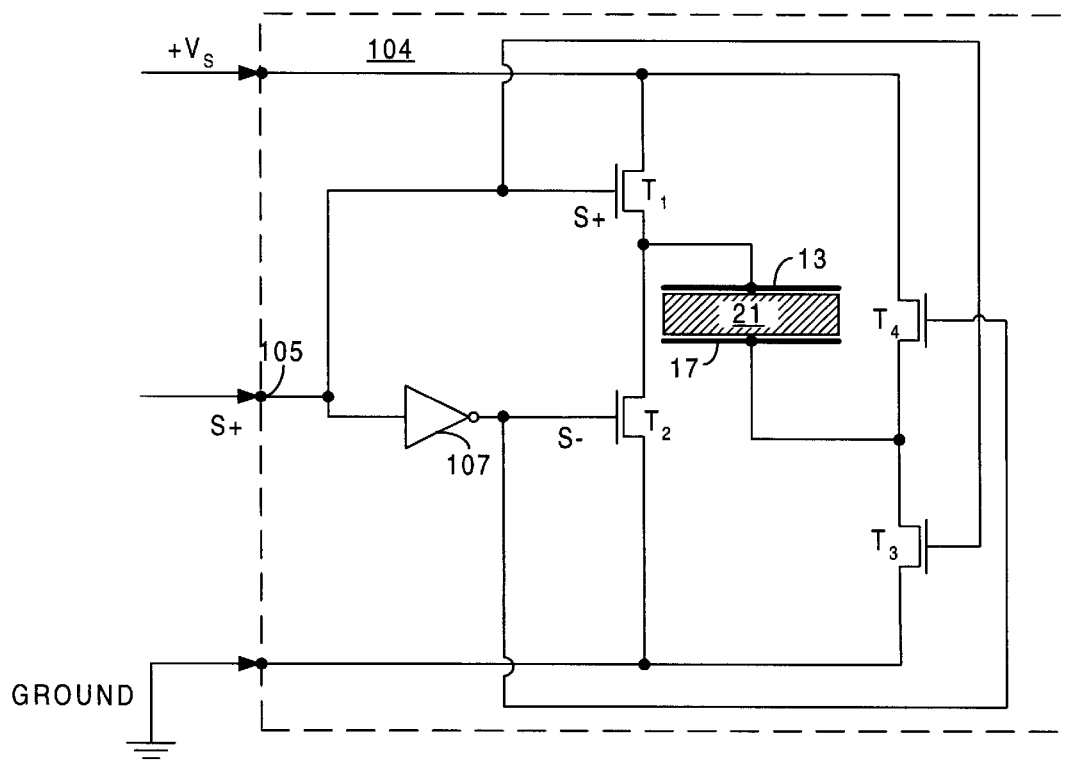

FIG. 10B depicts an electric field direction switching circuit 104 that switches the voltage of the first transparent electrode 13 one of the first voltage level ($V_S$) and a second voltage level (ground) in response to a control signal (S+) received at control signal input 105. The second transparent electrode 17 is simultaneously switched to the other of the first voltage level ($V_S$) and a second voltage level (ground). Here, the control signal (S+) is provided to the gates of transistor $T_1$ and transistor $T_3$. At the same time, the inverted control signal (S−) is provided to the gates of transistor $T_2$ and transistor $T_4$. Thus, when the control signal (S+) is in a high state corresponding to a logical "1", the transistor $T_1$ connects the first transparent electrode to the first voltage level ($V_S$) and the transistor $T_3$ connects the second transparent electrode to the second voltage level (ground). At the same time, the inverted signal (S−) is in a low state corresponding to a logical "0", transistor $T_2$ disconnects the first transparent electrode from the second voltage level (ground), and transistor $T_4$ disconnects the second transparent electrode from the first voltage level ($V_S$). When the control signal (S+) switches to a low state corresponding to a logical "0", the transistor $T_1$ disconnects the first transparent electrode from the first voltage level ($V_S$) and the transistor $T_3$ disconnects the second transparent electrode from the second voltage level (ground). At the same time, the inverted signal (S−) is in a high state corresponding to a logical "1", and transistor $T_2$ connects the first transparent electrode to the second voltage level (ground) while the transistor $T_4$ connects the second transparent electrode to the first voltage level ($V_S$).

In both FIG. 10A and FIG. 10B, when the control signal corresponds to a logical "1", the electric field direction switching circuit 104 switches the direction of the electric field across the layer of ferroelectric liquid crystal material to a forward direction. When the control signal corresponds to a logical "0", the electric field direction switching circuit 104 switches the direction of the electric field across the layer of ferroelectric liquid crystal material to a reverse direction.

Referring back to FIG. 9, the switchable half-wave plate 52 according to the invention also includes an electric field magnitude control circuit 109 in electrical communication with at least one of the first transparent electrode 13, the second transparent electrode 17, and the electric field direction switching circuit 104. The electric field magnitude control circuit 109 receives an alignment control signal (M) at an alignment control signal input 111. In response to the alignment control signal (M), the electric field magnitude control circuit adjusts at least one of the first angle and the second angle. The alignment control signal input 111 may be in electrical communication with a user input 72 for manual adjustment of the alignment control signal (M). The user input may be as simple as a manually controlled variable resistor in series with stable voltage source. Alternatively, the user input may be any number of analog or digital user inputs known in the art for adjusting a voltage level. The user input may be a fixed mechanical input or part of a graphical user interface that can change as needed. For purposes of this description, the user input 72 is any input provided by a user which is used to control a magnitude control signal (M) that affects the magnitude of an electric field across the ferroelectric liquid crystal material 21 in at least one of a forward and a reverse direction.

Figure 12:
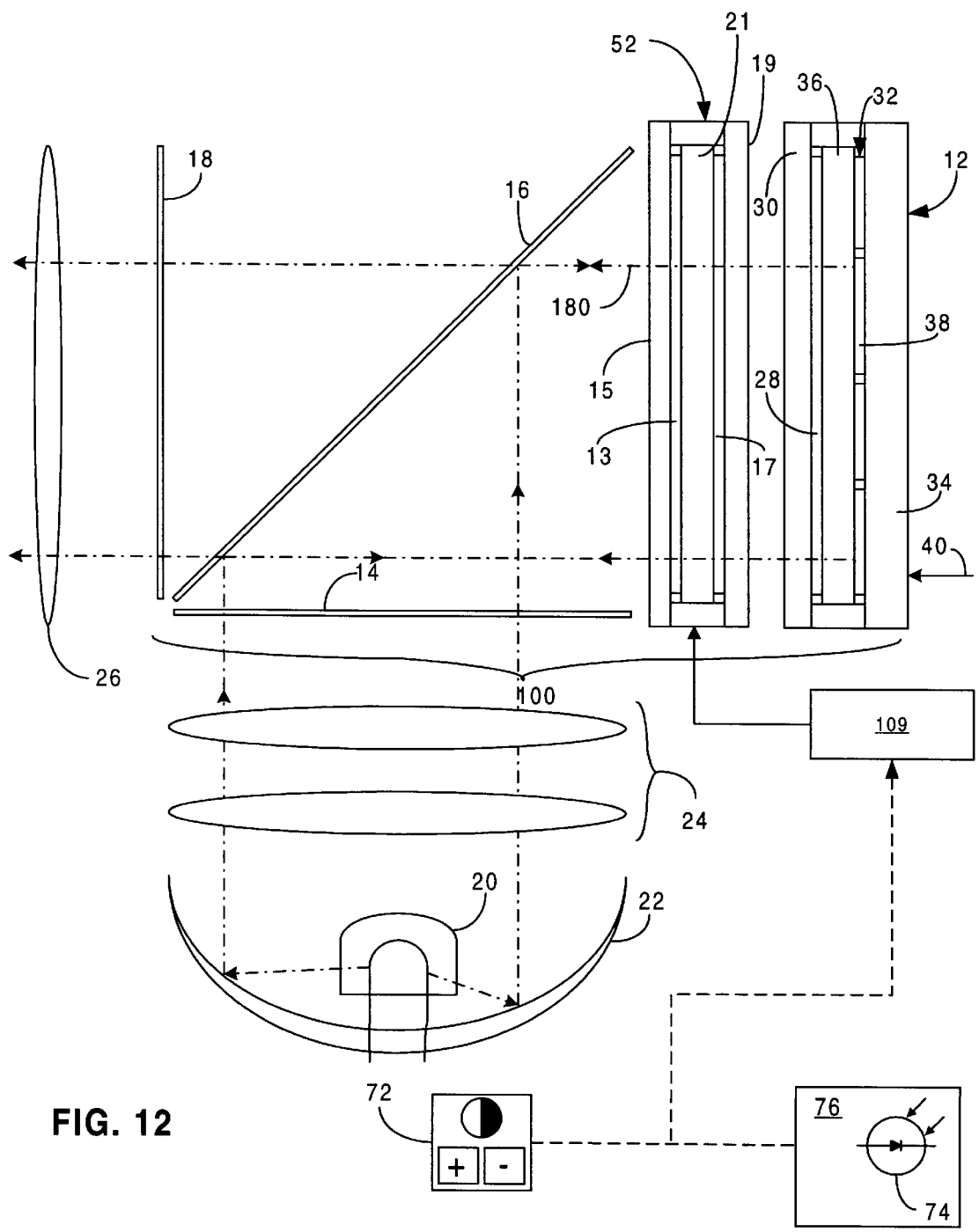
FIG. 12 is a schematic view of a light valve system according to the invention.

Alternatively, the alignment control signal input 111 may be electric communication with a feedback circuit 76 that includes a light intensity sensor 74. The feedback circuit automatically optimizes the electric field magnitude control signal (M). A schematic diagram of an automatic feedback circuit including a light intensity sensor is depicted in FIG. 12. The operation of the feedback circuit is described in detail, below.

Referring back to FIG. 9, the switchable half-wave plate 52 according to the invention may also include a heater 113 positioned proximate to the ferroelectric liquid crystal material 21. The heater is preferably transparent and affixed to at least one of the first transparent cover 15 and the second transparent cover 19. Transparent heaters are known that create heat by running a current through a transparent conductor such as indium-tin-oxide (ITO). In addition, a temperature control circuit (not shown) may be included in the switchable half-wave plate 52 to control the operation of the heater so the ferroelectric liquid crystal material 21 is maintained within a desired temperature range. Temperature control circuits are known in the art and will not be further described here.

FIG. 12 depicts a ferroelectric liquid crystal-based light valve system 100, according to the invention. The light valve system 100 includes at least one ferroelectric liquid crystal-based spatial light modulator 12, an analyzer 18, a ferroelectric liquid crystal-based switchable half-wave plate 52 and an adjustable voltage source 109. For purposes of this description, the term analyzer 18 can mean the analyzer 18 or a polarizing beam splitter 16 configured to function as an analyzer as has been previously described. The switchable half-wave plate is located along an optical path 180 between the at least one spatial light modulator and the analyzer. The switchable half wave plate 52 includes a first transparent electrode 13, a second transparent electrode 17, ferroelectric liquid crystal material 21 sandwiched between the first transparent electrode and the second transparent electrodes, and a switching circuit (not shown in this figure). The switching circuit is configured to switch an electric field across the ferroelectric liquid crystal material 21 between a forward direction and a reverse direction. Since these elements of the switchable half-wave plate 52 have been previously described in detail, they will not be described again here.

Adjustment of the voltage source 109 controls the magnitude of the electric field across the switchable half-wave plate. The voltage source is in electrical communication with at least one of the switching circuit, the first transparent electrode 13 and the second transparent electrode 17. It is preferred that the output of the voltage source ($V_S$) is the first voltage level in the previously described switching circuits 104 depicted in FIGS. 10A and 10B.

The light valve system 100 may also include a user input 72 in electrical communication with the voltage source. If included, the output voltage level of the voltage source is adjusted in response to a user's commands entered at the user input. The user input has been previously described and will not be described again here. Additionally or alternatively, the light valve system 100 may include a feedback circuit 76 for automatic control of the magnitude of the electric field across the ferroelectric liquid crystal layer 21. The magnitude is controlled by automatically adjusting the output voltage level of the voltage source 109.

Figure 1:
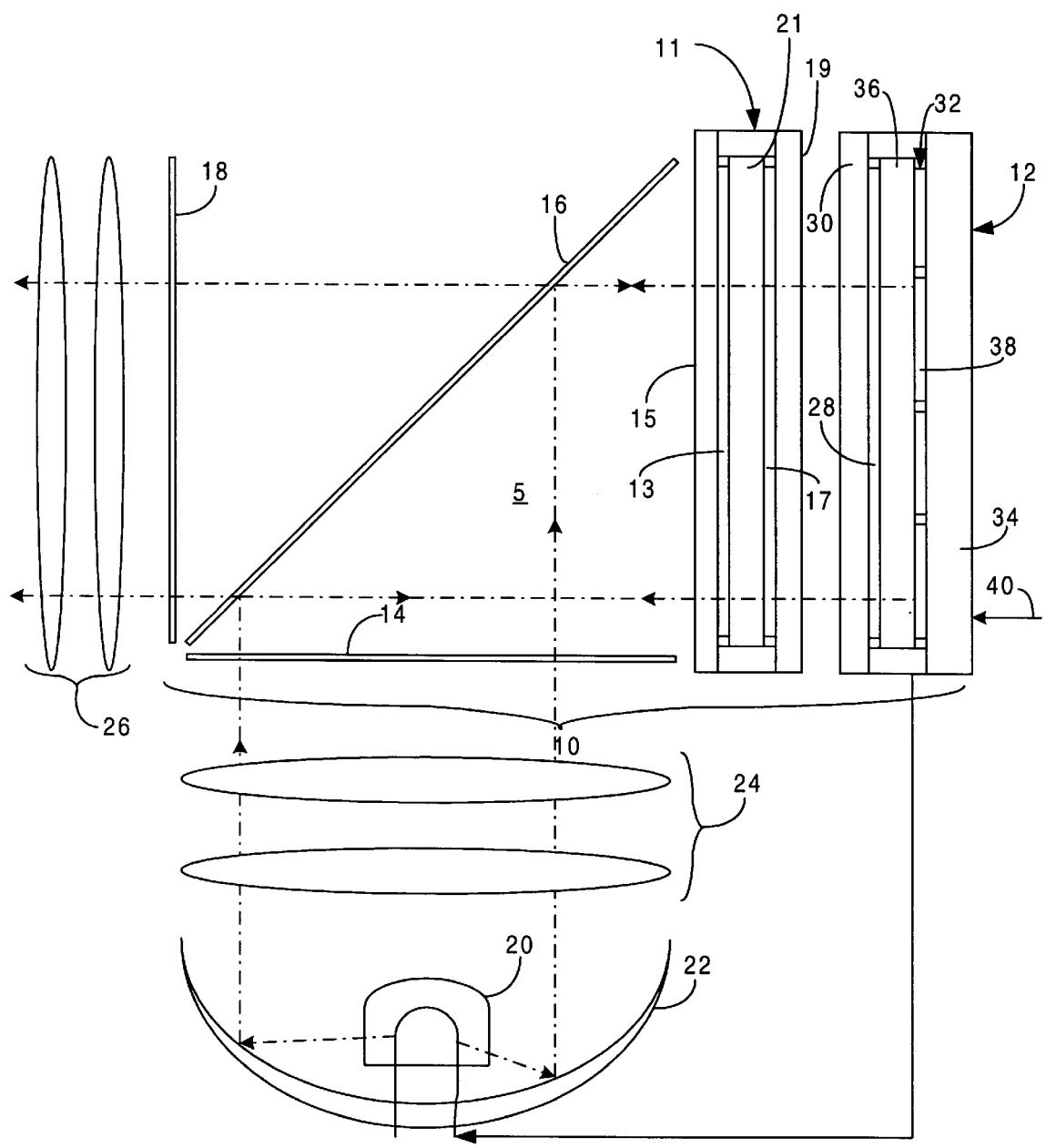
FIG. 1 is a schematic diagram of part of a prior art display device incorporating a conventional reflective light valve system with a single spatial light modulator and a switchable half-wave plate.
Figure 2:
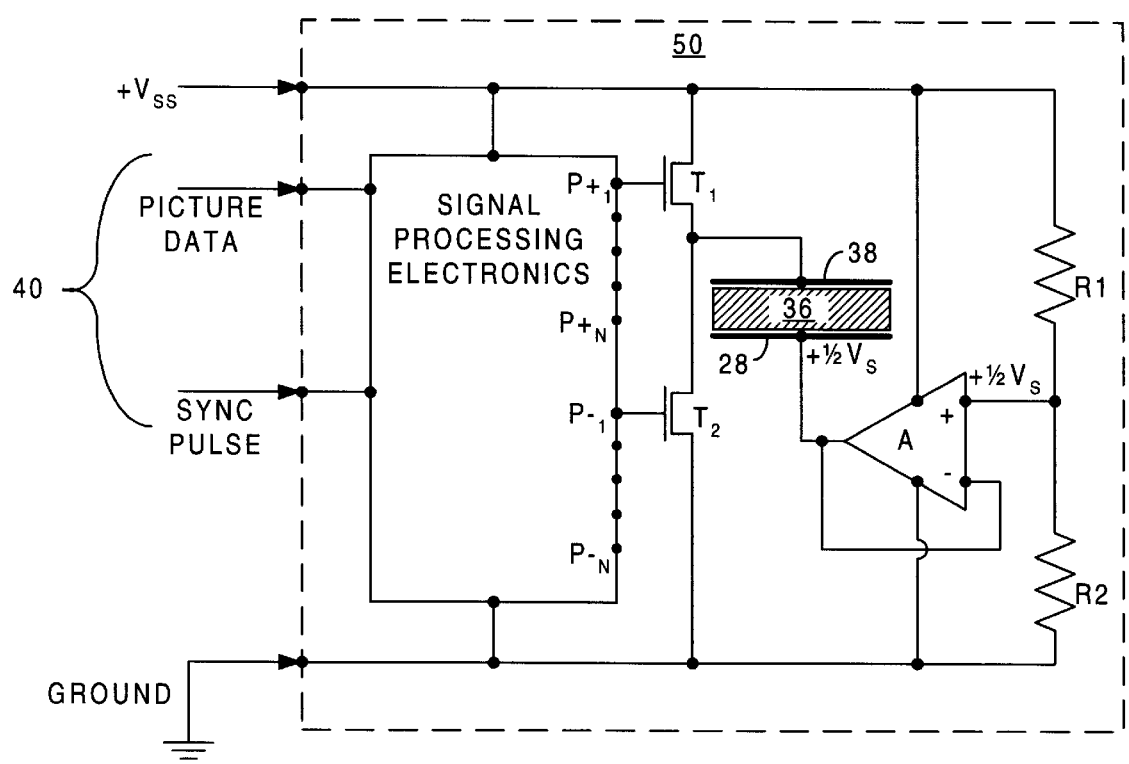
FIG. 2 is a schematic diagram of a prior art drive circuit from a spatial light modulator like that shown in FIG. 1.
Figures 3A, 3B, 3C, 3D, 3E:
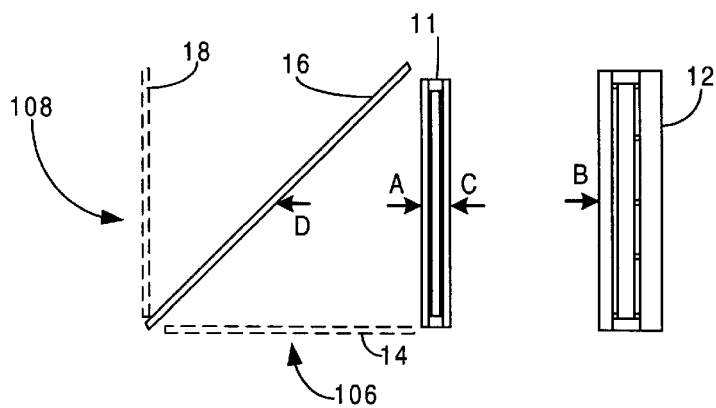
FIGS. 3A–3E illustrate the operation of the switchable half-wave plate shown in FIG. 1.
Figure 4:
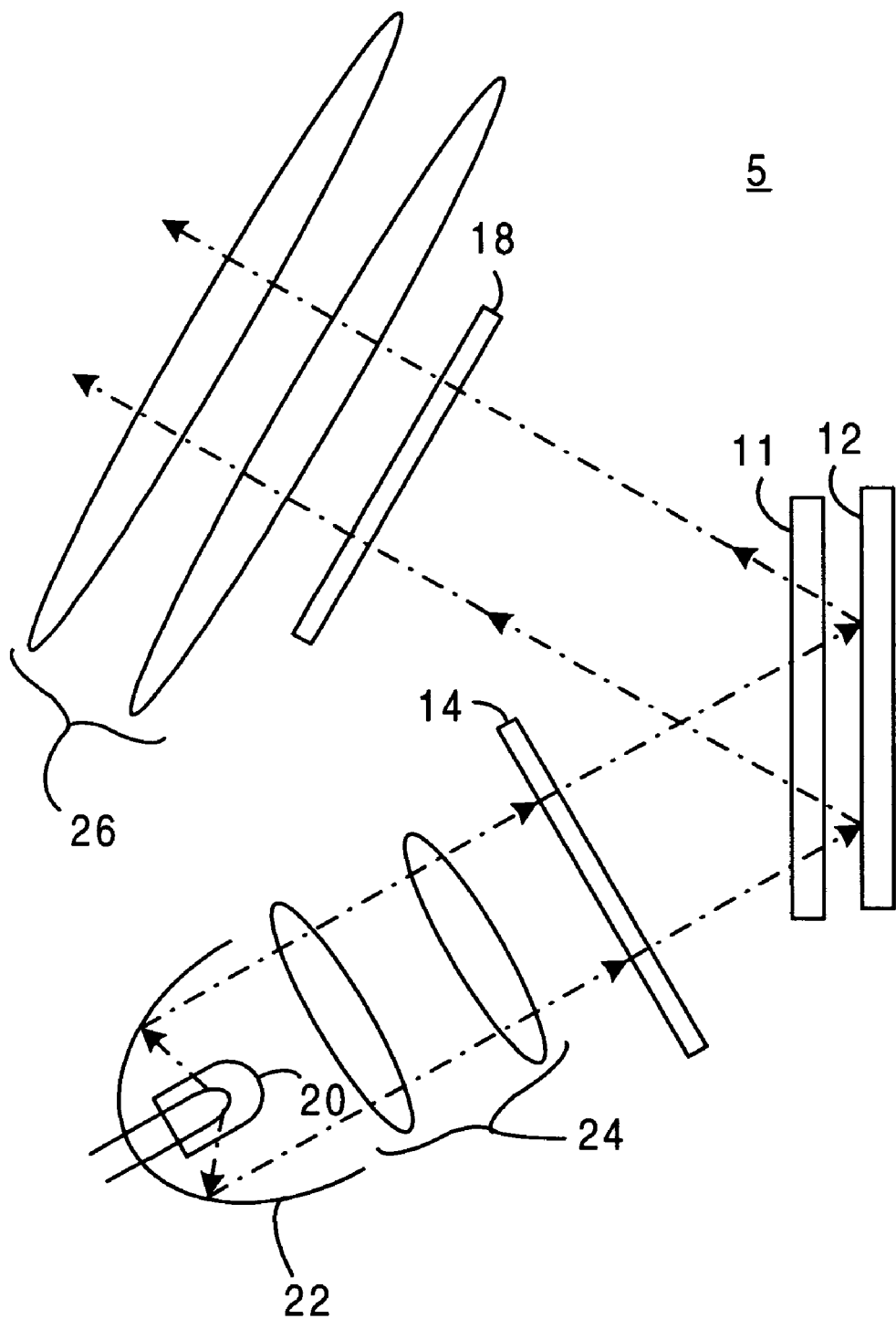
FIG. 4 is a schematic diagram of part of a prior art display device incorporating a conventional reflective light without a beam splitter.
Figure 5:
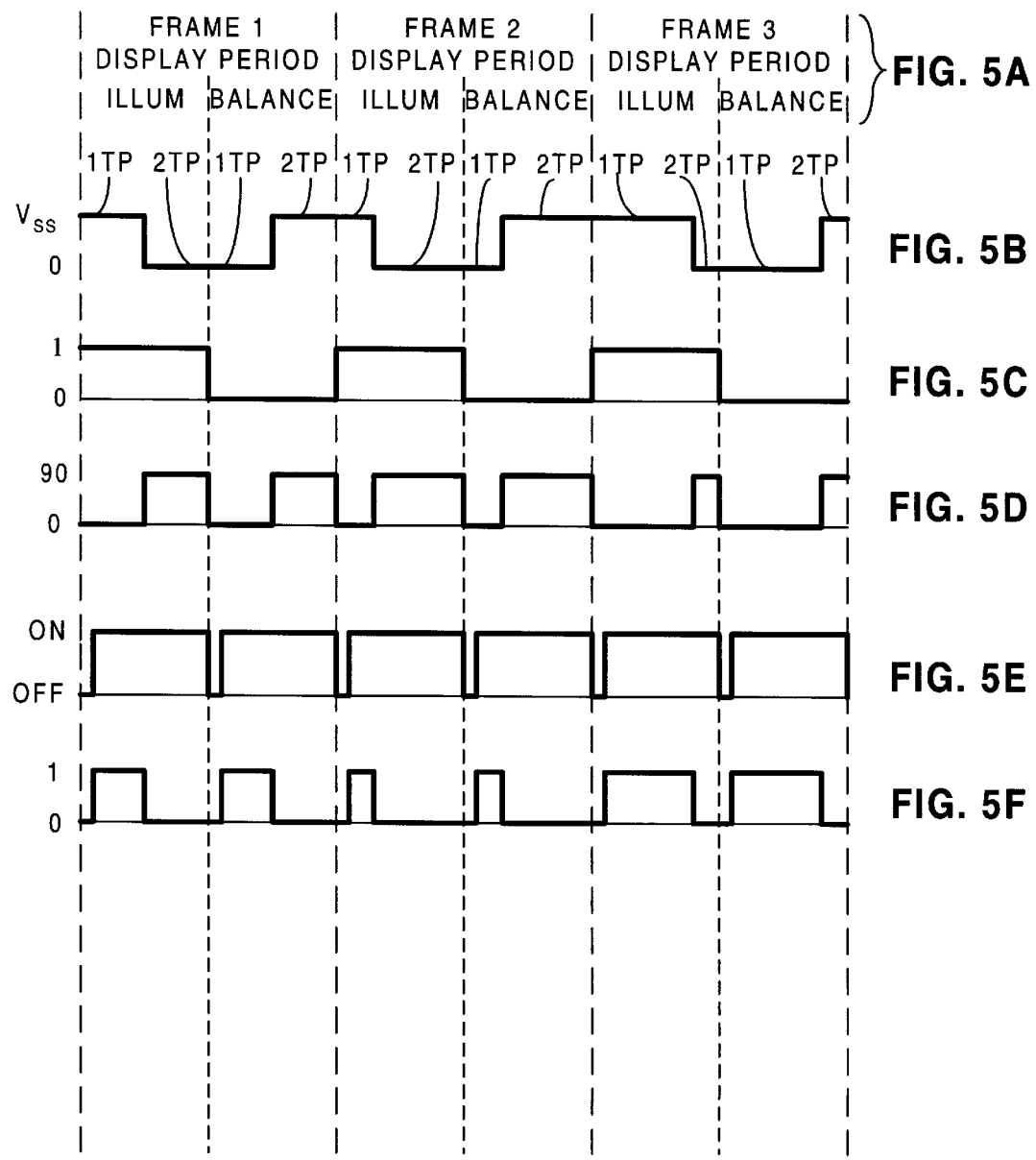
FIGS. 5A–5F illustrate the operation of the prior art light valve system depicted in FIG. 1.
Figure 6:
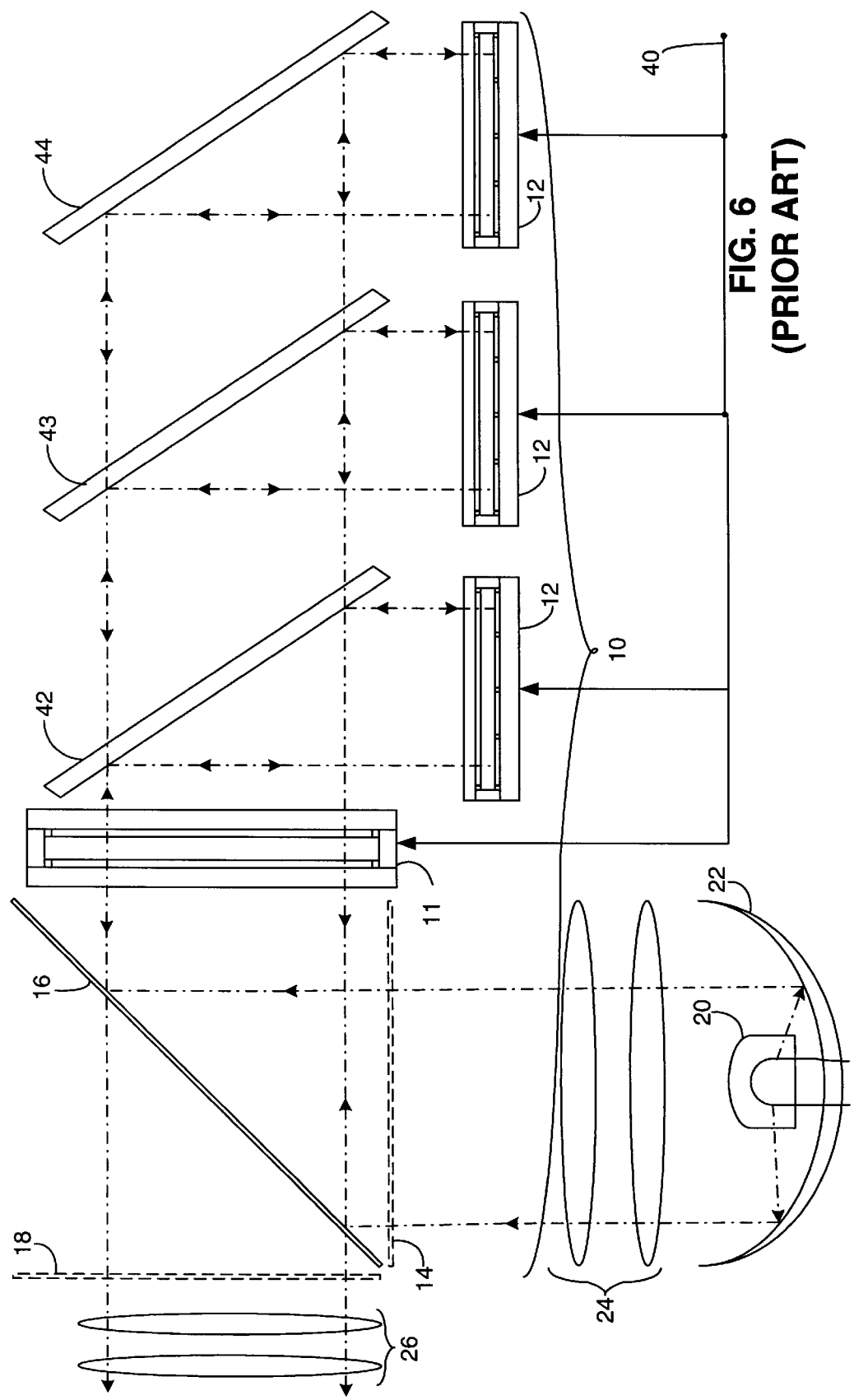
FIG. 6 is a schematic diagram of part of a prior art display device incorporating a conventional reflective light valve with three spatial light modulators for color.
Figure 7A:
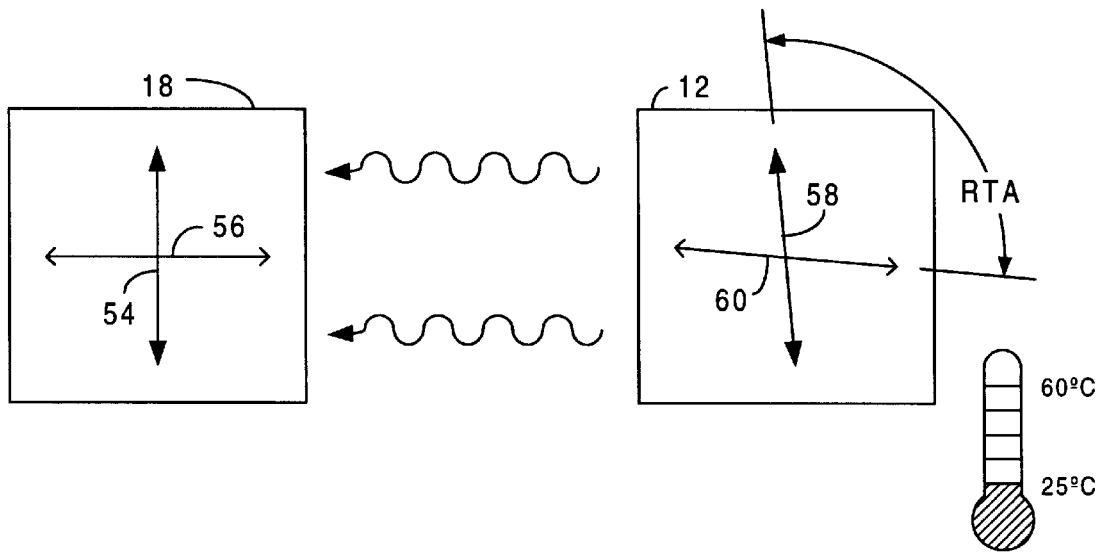
FIG. 7A is a schematic diagram depicting alignment of a spatial light modulator with an analyzer from a prior art display device at room temperature.
Figure 7B:
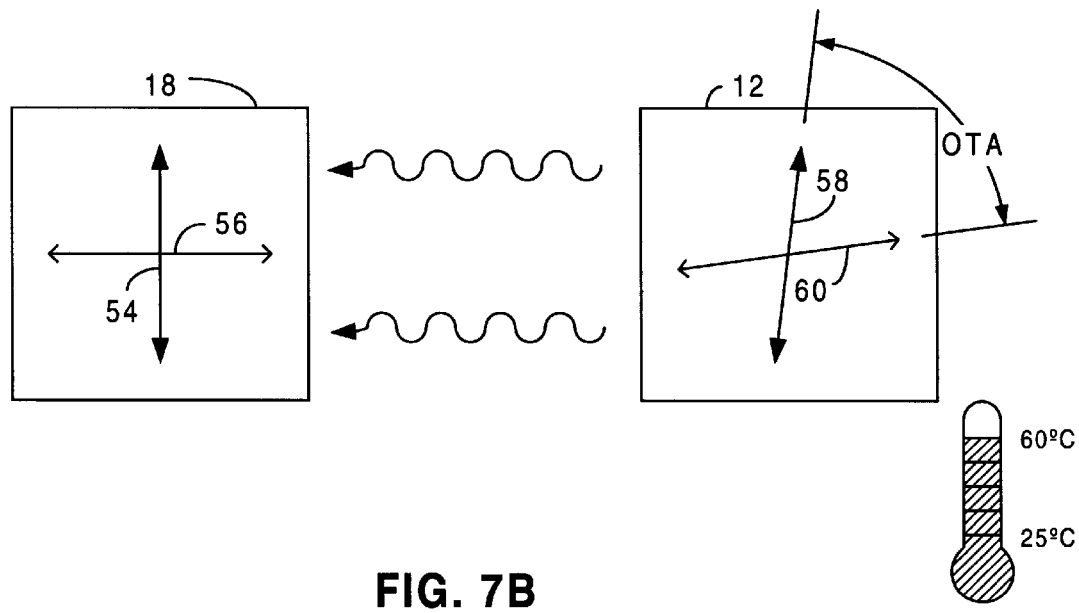
FIG. 7B is a schematic diagram depicting alignment of a spatial light modulator with an analyzer from a prior art display device at operating temperature.
Figure 11:
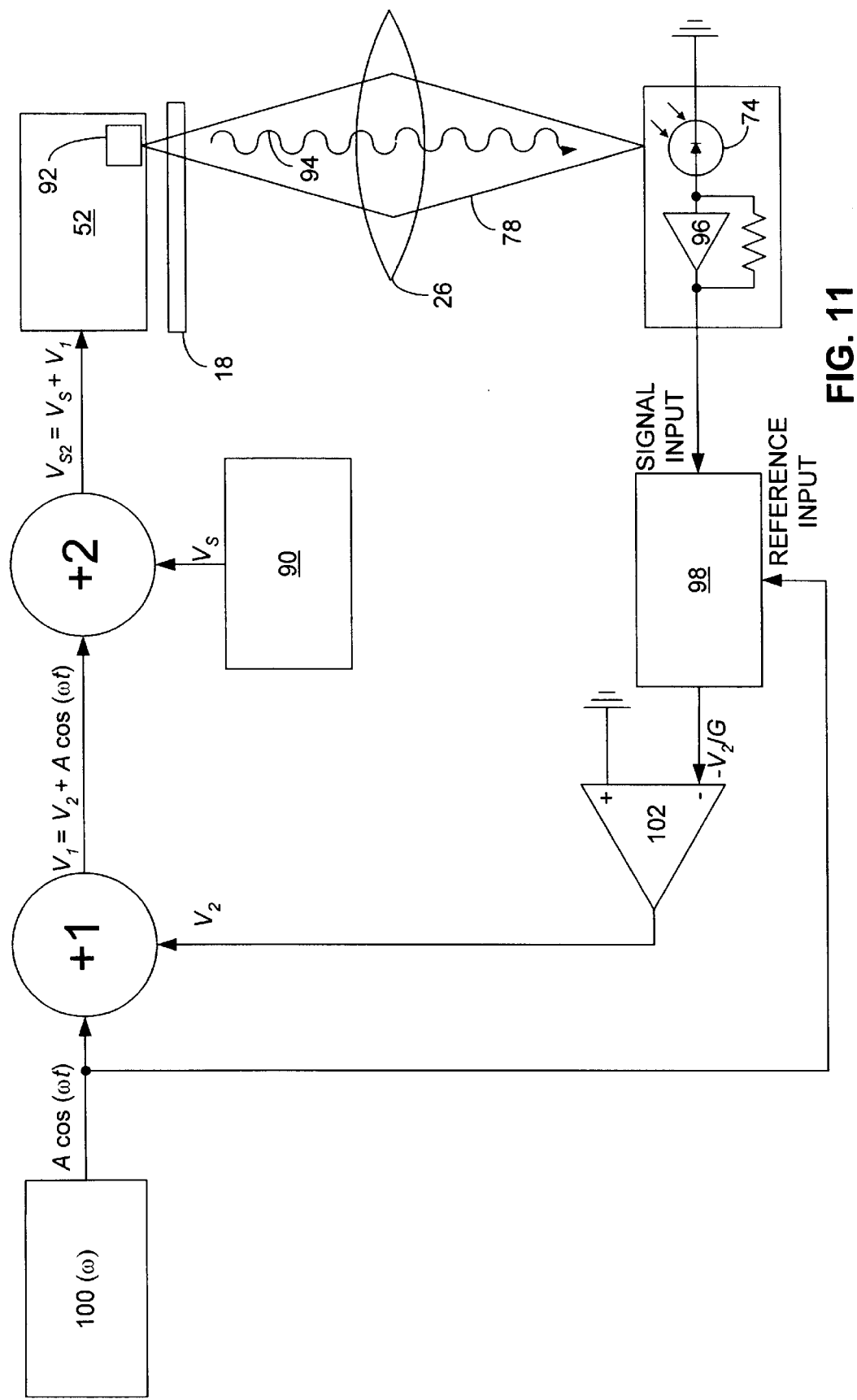
FIG. 11 is a schematic view of a automatic contrast control feedback circuit according to the invention.

FIG. 11 depicts the automatic feedback circuit 76. The circuit operates on the premise that when the intensity of the 0 output state light transmitted through the analyzer is minimized, contrast is maximized and the tilt angle of the switchable half-wave plate has been optimized. Thus, the feedback circuit 76 is designed to maximize contrast by minimizing the intensity of light having a 0 output state detected by the light intensity sensor 74. For purposes of this description, it is assumed that the array of pixels 68 are driven with a circuit like that shown in FIG. 2 having a fixed voltage input ($V_{SS}$), and the switchable half-wave plate 52 is driven with a circuit like that shown in FIG. 10A or 10B having a variable voltage input ($V_S$). Thus, a single variable input voltage level ($V_S$) controls the magnitude of the electric field across the ferroelectric liquid crystal material 21 of the switchable half-wave plate in both the forward and reverse directions. It is also assumed that the variable input voltage level ($V_S$) is the sum of a steady state voltage ($V_{SS}$) from a voltage supply 90 and a correction voltage ($V_1$). The steady state voltage ($V_{SS}$) is selected to provide reasonable alignment across temperatures as is known in the art. The correction voltage ($V_1$) is calculated based on the intensity of light 94 having the 0 output state that is received at the light intensity sensor 74 after passing through the analyzer 18. The 0 output state is depicted in FIGS. 3B, 3E, 8A and 8D. The 0 output state corresponds to when both the switchable half-wave plate and the pixel of the spatial light modulator have the same state, either both 0 or both 1.

This intensity of this light 94 falling on the light intensity sensor 74 generates a photo-current that is amplified by amplifier 96. The amplified signal is then supplied as an input signal to a lock-in amplifier 98 such as an EG&G Princeton Applied Research Model 5209. A reference signal is also supplied to the lock-in amplifier. The reference signal is taken from the output of an oscillator 100 having frequency ω. The output of the oscillator would thus be A cos(ωt) where A is the amplitude of the output typically in the range of between 1 and 100 millivolts and t is time in seconds. The output of the reference amplifier is then fed into an operational amplifier 102 which has a gain (G) on the order of $10^4$ or greater. The operational amplifier 102 output ($V_2$) is then fed into a first summing amplifier (+1) along with the output of the oscillator 100. The first summing amplifier (+1) output ($V_1$) thus becomes $V_2+A \cos(\omega t)$. The output ($V_2$) of the first summing amplifier is fed into a second summing amplifier (+2) along with the voltage supply 90 output ($V_{SS}$). The second summing amplifier (+2) output ($V_S$) thus becomes $V_1+V_{SS}$.

For purposes of this figure, the feedback circuit 76 includes the lock-in amplifier 98, oscillator 100, operational amplifier 102, and the first summing amplifier (+1). The adjustable voltage source 109 includes, the voltage supply 90 and the second summing amplifier (+2).

In the feedback circuit depicted in FIG. 11, the intensity of the light at the light intensity sensor 74 can be calculated based on the equation: $D=k(V_1-V_0)^2+D_0$. In the equation D is the intensity of light at the light intensity sensor (in Watts/meter$^2$), k is a constant, $V_1$ is the correction voltage $V_0$ is the correction voltage when the intensity of light is minimized, and $D_0$ is that minimized intensity. $D_0$ and $V_0$ would occur when the analyzer 18 blocks virtually all the light having the 0 output state. Since $V_1$ is the output of the first summing amplifier (+1) and is equal to $V_2+A \cos(\omega t)$, this can be substituted into the equation for D as follows:

$$D = \left(k(V_2 - V_0)^2 + D_0 + \frac{k^2 A^2}{2}\right) + 2k(V_2 - V_0)A\cos\omega + \frac{k^2 A^2 \cos 2\omega}{2}$$

Thus, D consists of three components: a constant term, a component with an angular frequency ω and a component with an angular frequency 2ω. The component with angular frequency ω has an amplitude $2k(V_2-V_0)A$. Thus, when $V_2=V_0$, the amplitude of this component is zero. The corresponding value of $V_1$ is then $V_0+A \cos \omega t$. If A is sufficiently small, the effect of the sinusoidal variation in intensity will be invisible, and then, for all practical purposes, $V_1=V_0$ and the tilt angle is optimized.

Figure 13:
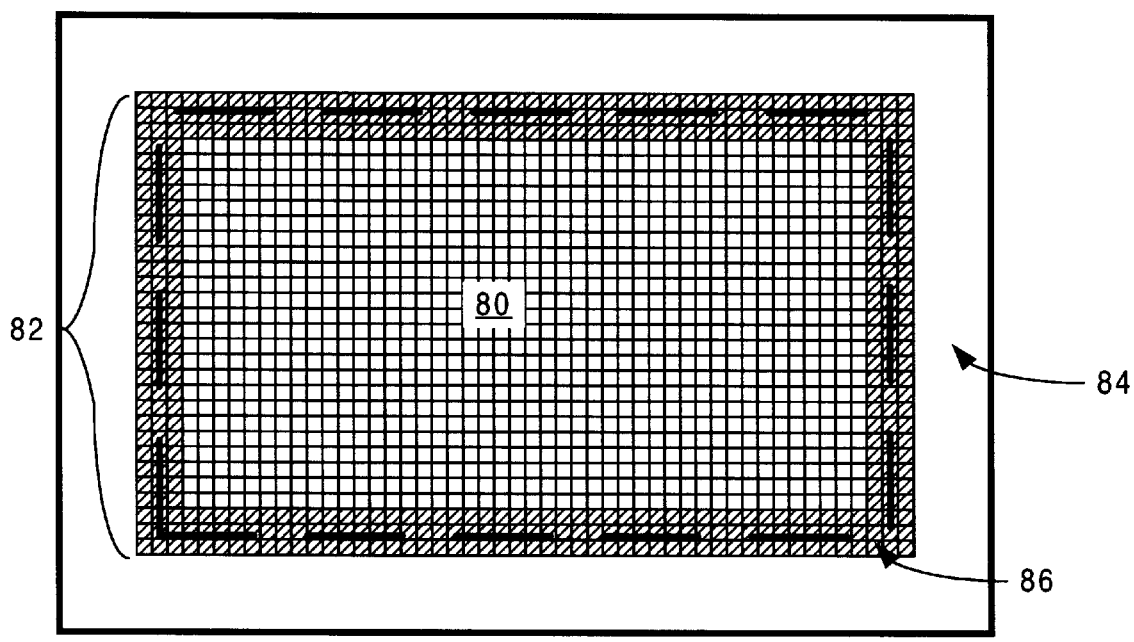
FIG. 13 is a rear view of a prior art projection screen depicting the light from an array of pixels with perimeter pixels in a 0 output state.

Ensuring that the light intensity sensor 74 is not illuminated by light in the 1 output state can be challenging. One way this can be done is to position the light intensity sensor 74 so it is illuminated only by light reflected from those pixels 68 used to define and adjust a border area of the image produced by the spatial light modulator. FIG. 13 depicts a prior art rear projection screen 80 onto which light 82 reflected from the plurality of pixels (not shown), having been transmitted (twice) by the switchable half-wave plate (not shown) and transmitted through the analyzer (not shown) is projected by the imaging optics (not shown). The side of the screen onto which the light is projected is shown and a user would normally view the projected light 82 from the opposite side of the screen (not shown). A screen bezel 84 located between the border of the screen and the user defines the viewable area of the screen A number of the "border pixels" constantly have a 0 output state to project a frame 86 (indicated by hash-marks) in the projected light.

The frame is used in prior art light valves to allow for some misalignment of the projected light 82 with the viewable area of the screen 80. Thus, the image projected on the screen can be moved by widening the frame on one side while narrowing the frame on the opposite side. For example, the image can be moved left by increasing the number of pixels making up the width of the frame on the right side of the image while simultaneously decreasing the number of pixels making up the width of the frame on the left side of the image. The frame can also be used to provide fine control over the height and width of the image viewed.

Figure 14:
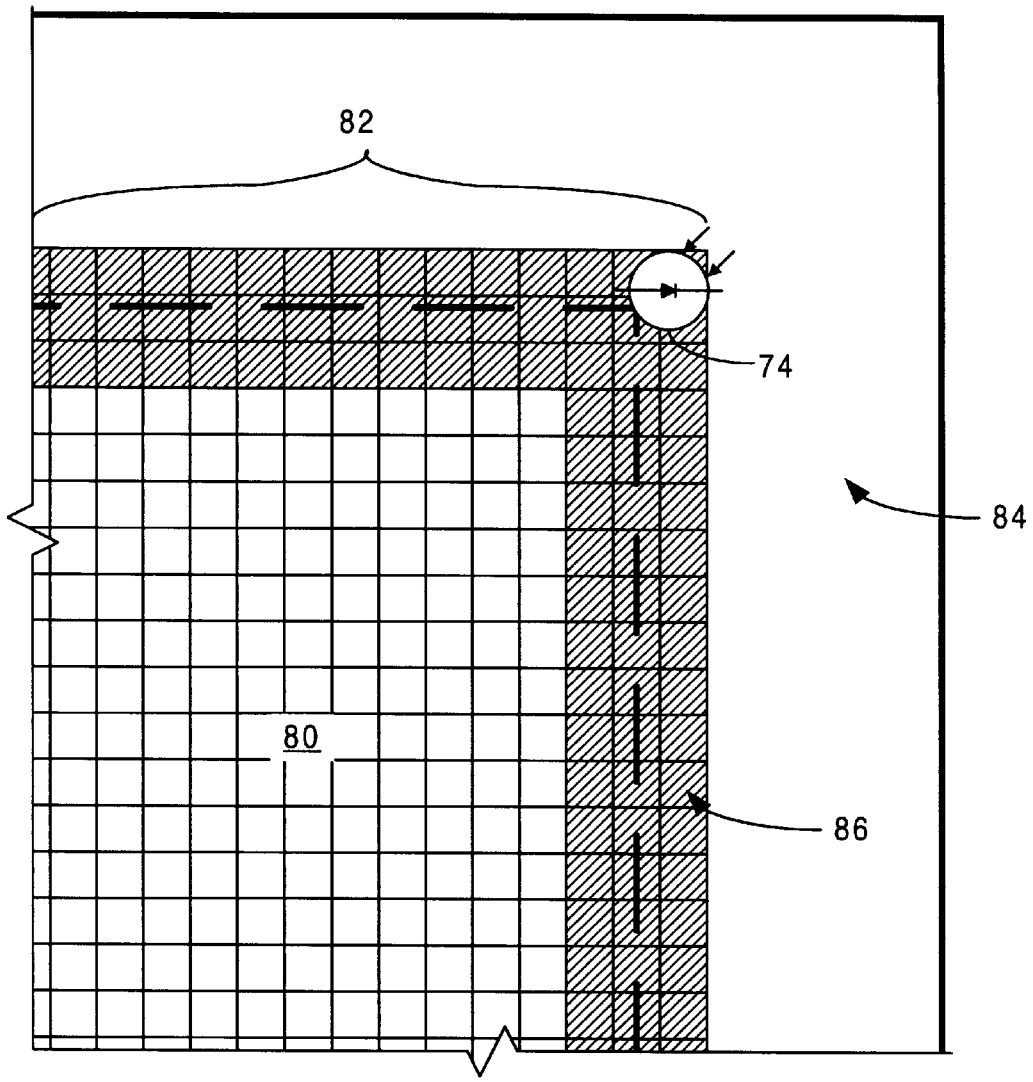
FIG. 14 is a light intensity sensor positioned to be illuminated by pixels in the 0 output state according to the invention.

FIG. 14 shows a portion of the screen 80 and projected light 82 as in FIG. 13 adapted to be used with a light intensity sensor 74 according to the invention. The light intensity sensor 74 is placed against the screen in so that it is illuminated by the light of the frame pixels having the 0 output state, but is located within the area of the screen 80 covered by the bezel 84 so that any shadow cast by the light intensity sensor is not visible to a viewer. One type of suitable light intensity sensor is a UDT-604 manufactured by UDT Sensors, Inc. The UDT has an overall diameter of 5.3 mm, and the area of the active surface is 0.8 mm$^2$. This device incorporates an integrated transresistance amplifier, and so provides a voltage output substantially proportional to the light flux absorbed by the active area. Alternatively, a light intensity sensor may be selected that is small enough or transparent enough so that its affect on the light seen by the view is minimized.

Figure 15:
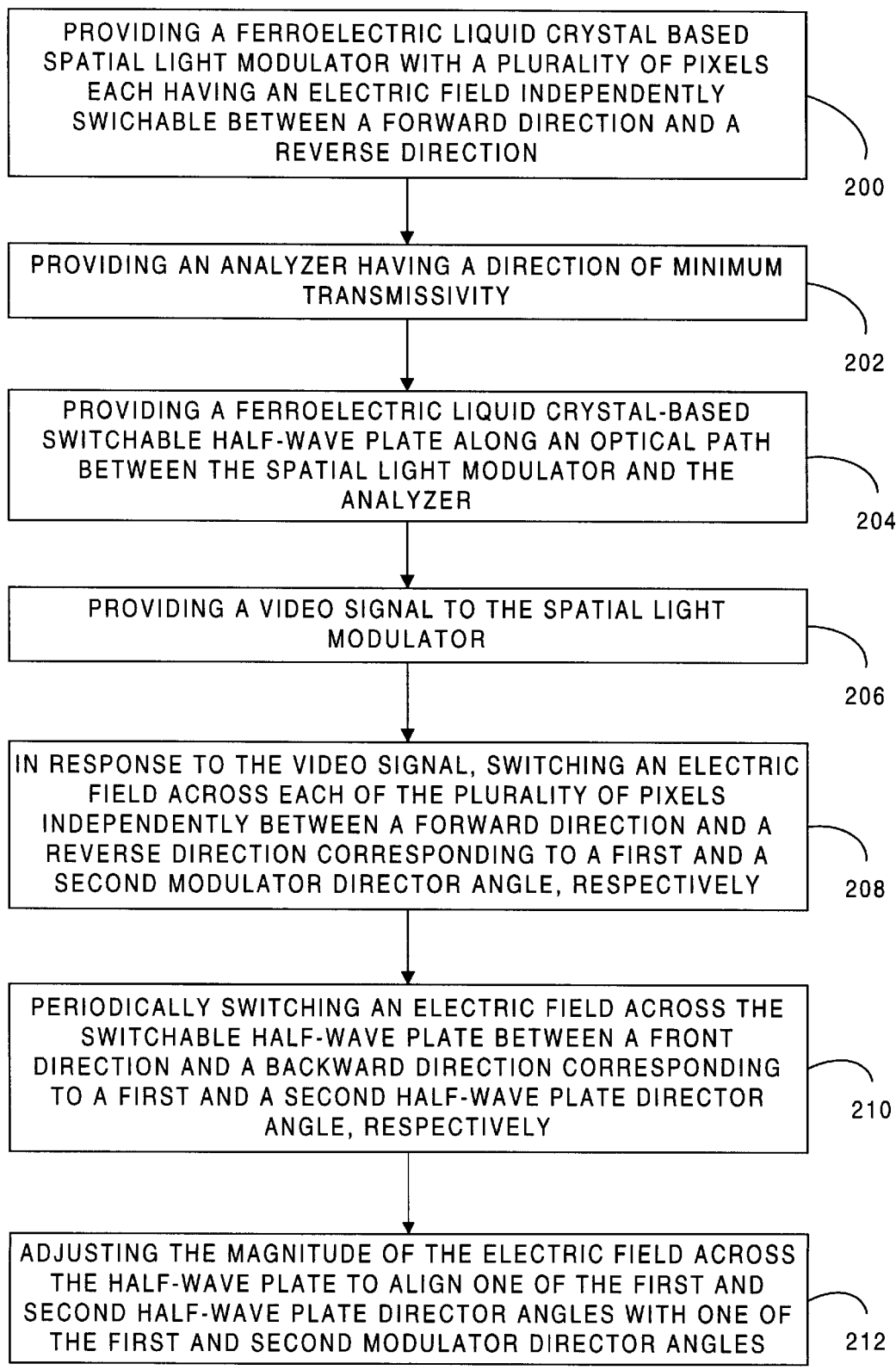
FIG. 15 is a flow chart depicting the method according to the invention.

FIG. 15 is a flowchart depicting a method improving contrast in a ferroelectric liquid crystal-based light valve system. The method begins by providing a ferroelectric liquid crystal-based spatial light modulator 12 including a plurality of pixels (block 200). Next, an analyzer 18 is provided that has a direction of minimum transmissivity (block 202). Then a ferroelectric liquid crystal based switchable half-wave plate 52 along an optical path between the spatial light modulator and the analyzer is provided (block 204).

A video signal 40 is then provided to the spatial light modulator 12 (block 206). Based on this video signal, a pixel a pixel electric field across each of the plurality of pixels is independently switched between a forward direction corresponding to a first modulator director angle, and a reverse direction corresponding to a second modulator director angle (block 208). Meanwhile, a half-wave plate electric field across the switchable half-wave plate is switched periodically (block 210) between a front direction corresponding to a first half-wave plate director angle, and a backward direction corresponding to a second half-wave plate director angle.

The magnitude of the half-wave plate electric field is also adjusted (block 212) to align one of the first and the second half-wave plate director angles with one of the first and the second modulator director angles.

The method of contrast control according to the invention may also include heating the switchable half-wave plate to provide rough contrast control while adjusting the magnitude of the half-wave plate electric field to provide fine contrast control. Thus a heater 113 could be used to keep the temperature of the liquid crystal material 21 in the switchable half-wave plate close to that of the liquid crystal material 36 in the spatial light modulator 12. Adjusting the magnitude of the half-wave plate electric field would be done to provide precise automatic contrast control or for user control of contrast through a user input.

The method of improving contrast in a light valve system according to the invention may further include providing light having a first direction of polarization and illuminating the plurality of pixels with the provided light. The light having a first direction of polarization may either be from a polarized light source (not shown) or from light transmitted through polarizer 14. Preferably the light having the first direction of polarization is transmitted twice through the switchable half-wave plate, once before being reflected by the pixels and once after being reflected by the pixels. The first direction of polarization is also preferably aligned closely parallel to one of the first and second modulator director angles and to one of the first and second half-wave plate director angles. Additionally the first direction of polarization if preferably closely parallel to the direction of minimum transmissivity of the analyzer.

The step of adjusting the magnitude of the switchable half-wave plate electric field according to the invention may include using a feedback circuit as previously described that may include a light intensity sensor 74.

Although this disclosure describes illustrative embodiments of the invention in detail, it is to be understood that the invention is not limited to the precise embodiments described, and that various modifications may be practiced within the scope of the invention defined by the appended claims.

I claim:

1. A ferroelectric liquid crystal-based switchable half-wave plate with improved alignment control comprising:
    a first transparent electrode;
    a second transparent electrode;
    a layer of ferroelectric liquid crystal material sandwiched between the first transparent electrode and the second transparent electrode, the ferroelectric liquid crystal material defining a director, the director having:
        a first angle when an electric field between the first transparent electrode and the second transparent electrode has a forward direction, and
        a second angle when the electric field has a reverse direction;
    an electric field direction switching circuit in electrical communication with at least one of the first transparent electrode and the second transparent electrode, the electric field direction switching circuit:
        including a control signal input, and
        configured to switch the electric field between the forward direction and the reverse direction in response to the control signal; and
    an electric field magnitude control circuit in electrical communication with at least one of the first transparent electrode, the second transparent electrode, and the electric field direction switching circuit, the electric field magnitude control circuit including an alignment control signal input,
    whereby, the electric field magnitude control circuit adjusts at least one of the first angle and the second angle in response to a signal received at the alignment control signal input.

2. The switchable half-wave plate with improved alignment control of claim 1, additionally including a heater positioned proximate to the ferroelectric liquid crystal material.

3. The switchable half-wave plate with improved alignment control of claim 2, in which the heater includes a temperature control circuit for keeping the ferroelectric liquid crystal material within a range of temperatures.

4. The switchable half-wave plate with improved alignment control of claim 1, in which the alignment control signal input is in electrical communication with a user input.

5. The switchable half-wave plate with improved alignment control of claim 1, in which the alignment control signal input is in electrical communication with a feedback circuit including a light intensity sensor.

6. The switchable half-wave plate with improved alignment control of claim 1, additionally including:
   a heater positioned proximate to the ferroelectric liquid crystal material;
   a temperature sensor positioned to detect the temperature of the ferroelectric liquid crystal material.

7. A ferroelectric liquid crystal-based light valve system comprising:
   at least one ferroelectric liquid crystal-based spatial light modulator;
   an analyzer having a direction of minimum transmissivity;
   a ferroelectric liquid crystal-based switchable half-wave plate located along an optical path between the at least one spatial light modulator and the analyzer, the switchable half-wave plate including:
      a first transparent electrode,
      a second transparent electrode,
      ferroelectric liquid crystal material sandwiched between the first transparent electrode and the second transparent electrodes, and
      a switching circuit in electrical communication with at least one of the first transparent electrode and the second transparent electrode, the switching circuit configured to switch an electric field across the ferroelectric liquid crystal material between a forward direction and a reverse direction; and
   a voltage source having an adjustable output voltage level, the voltage source:
      in electrical communication with at least one of the switching circuit, the first transparent electrode and the second transparent electrode, and
      configured to adjust a magnitude of the electric field in at least one of the forward direction and reverse direction as the output voltage level is adjusted.

8. The light valve system of claim 7, additionally including a user input in electrical communication with the voltage source; and
   in which the output voltage level is adjusted in response to user inputs.

9. The light valve system of claim 7, additionally including:
   a feedback circuit in electrical communication with the voltage source.

10. The light valve system of claim 9, in which the feedback circuit includes a light intensity sensor positioned to be illuminated by light transmitted though the analyzer.

11. The light valve system of claim 10, in which the light intensity sensor is configured to detect the intensity of light having a direction of polarization within 10 degrees of the direction of minimum transmissivity.

12. The light valve system of claim 11, in which the feedback circuit is configured to adjust the output voltage level to minimize the intensity of light detected by the light intensity sensor.

13. A method of improving contrast in a ferroelectric light valve system, the method comprising:
   a) providing a ferroelectric liquid crystal-based spatial light modulator including a plurality of pixels;
   b) providing an analyzer having a direction of minimum transmissivity;
   c) providing a ferroelectric liquid crystal based switchable half-wave plate along an optical path between the spatial light modulator and the analyzer;
   d) providing a video signal to the spatial light modulator;
   e) switching a pixel electric field across each of the plurality of pixels independently between a forward direction corresponding to a first modulator director angle, and a reverse direction corresponding to a second modulator director angle, in response to a video signal;
   f) switching a half-wave plate electric field across the switchable half-wave plate periodically between a front direction corresponding to a first half-wave plate director angle, and a backward direction corresponding to a second half-wave plate director angle; and
   g) adjusting the magnitude of the half-wave plate electric field to align one of the first and the second half-wave plate director angles with one of the first and the second modulator director angles.

14. The method of improving contrast of claim 13, additionally comprising:
   heating the switchable half-wave plate.

15. The method of improving contrast of claim 13, additionally comprising:
   providing light having a first direction of polarization; and
   illuminating the plurality of pixels with the provided light.

16. The method of improving contrast of claim 15, in which illuminating the plurality of pixels includes transmitting the provided light through the switchable half-wave plate.

17. The method of improving contrast of claim 15, in which the first direction of polarization is aligned within 5 degrees of one of the first and the second modulator director angles.

18. The method of improving contrast of claim 17, in which step (g) includes detecting the intensity of the provided light transmitted through the analyzer after illuminating the plurality of pixels.

19. The method of improving contrast of claim 17, in which the direction minimum transmissivity of the provided analyzer is aligned with the first direction of polarization.

* * * * *